United States Patent
Kim et al.

(10) Patent No.: US 10,418,689 B2
(45) Date of Patent: Sep. 17, 2019

(54) ELECTRONIC DEVICE COMPRISING ANTENNA

(71) Applicant: Samsung Electronics Co., Ltd., Suwon-si, Gyeonggi-do (KR)

(72) Inventors: Ji Ho Kim, Anyang-si (KR); Kyung Moon Seol, Yongin-si (KR); Kyi Hyun Jang, Seoul (KR); Kyung Kyun Kang, Suwon-si (KR); Gyu Bok Park, Suwon-si (KR); Hyun Jeong Lee, Suwon-si (KR); Hyo Seok Na, Yongin-si (KR); So Young Lee, Gwacheon-si (KR); Jae Bong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/010,838

(22) Filed: Jun. 18, 2018

(65) Prior Publication Data
US 2018/0366812 A1    Dec. 20, 2018

(30) Foreign Application Priority Data

Jun. 20, 2017 (KR) .................. 10-2017-0078005

(51) Int. Cl.
*H01Q 1/24* (2006.01)
*H04M 1/02* (2006.01)
(Continued)

(52) U.S. Cl.
CPC .............. *H01Q 1/243* (2013.01); *H01Q 1/44* (2013.01); *H01Q 5/364* (2015.01); *H01Q 5/378* (2015.01);
(Continued)

(58) Field of Classification Search
CPC .......... H01Q 1/243; H01Q 1/44; H01Q 5/364; H01Q 5/378; H01Q 9/42; H01Q 13/106; H04M 1/0266; H04M 1/0277
(Continued)

(56) References Cited

U.S. PATENT DOCUMENTS 9,105,975 B2 *  8/2015  Satou ...................... H01Q 1/36
9,685,694 B2    6/2017  Choi et al.
(Continued)

FOREIGN PATENT DOCUMENTS

KR      20150117161       *  4/2014  ............ H01Q 1/243
KR      10-1529027 B1        6/2015
KR      10-2015-0117161 A   10/2015

OTHER PUBLICATIONS

European Search Report dated Oct. 12, 2018, issued in European Patent Application No. 18178482.8.

*Primary Examiner* — Mong-Thuy T Tran
(74) *Attorney, Agent, or Firm* — Jefferson IP Law, LLP

(57) ABSTRACT

An electronic device is provided. The electronic device includes a housing that includes a slit, a first antenna element extending along a portion of the housing, a second antenna element spaced apart from at least a portion of the first antenna element by the slit and extends along another portion of the housing, and a wireless communication circuit positioned inside the housing and electrically connected to the first antenna element. The first antenna element is electrically connected to the second antenna element.

19 Claims, 19 Drawing Sheets

(51) Int. Cl.
*H01Q 1/44* (2006.01)
*H01Q 9/42* (2006.01)
*H01Q 13/10* (2006.01)
*H01Q 5/364* (2015.01)
*H01Q 5/378* (2015.01)

(52) U.S. Cl.
CPC ............ *H01Q 9/42* (2013.01); *H01Q 13/106* (2013.01); *H04M 1/0266* (2013.01); *H04M 1/0277* (2013.01)

(58) Field of Classification Search
USPC ........................................................ 455/566
See application file for complete search history.

(56) References Cited

U.S. PATENT DOCUMENTS

| | | | |
|---|---|---|---|
| 9,716,307 B2 * | 7/2017 | Tsai | H01Q 13/106 |
| 9,966,667 B2 | 5/2018 | Ayala Vazquez et al. | |
| 10,056,695 B2 | 8/2018 | Ayala Vazquez et al. | |
| 2003/0090425 A1 * | 5/2003 | Ikegaya | H01Q 1/1221 343/767 |
| 2010/0013720 A1 * | 1/2010 | Sakata | H01Q 1/243 343/702 |
| 2012/0229361 A1 * | 9/2012 | Goins | H01Q 9/28 343/893 |
| 2012/0313827 A1 * | 12/2012 | Kim | H01Q 1/243 343/702 |
| 2013/0069836 A1 * | 3/2013 | Bungo | H01Q 1/243 343/724 |
| 2016/0164168 A1 | 6/2016 | Choi et al. | |
| 2016/0352015 A1 | 12/2016 | Roh et al. | |
| 2017/0033460 A1 | 2/2017 | Ayala Vazquez et al. | |
| 2017/0373372 A1 * | 12/2017 | Sun | H01Q 1/243 |
| 2018/0069293 A1 * | 3/2018 | Hu | H01Q 21/30 |
| 2018/0069317 A1 | 3/2018 | Ayala Vazquez et al. | |

* cited by examiner

<TYPE A>  <TYPE B>

<TYPE C>  <TYPE D>

ELECTRONIC DEVICE COMPRISING ANTENNA

CROSS-REFERENCE TO RELATED APPLICATION(S)

This application is based on and claims priority under 35 U.S.C. § 119(a) of a Korean patent application number 10-2017-0078005, filed on Jun. 20, 2017, in the Korean Intellectual Property Office, the disclosure of which is incorporated by reference herein its entirety.

BACKGROUND

1. Field

The disclosure relates to a technology for improving radiation performance of an antenna included in an electronic device.

2. Description of Related Art

An electronic device such as a smartphone, a tablet, or the like may communicate with a network by using an antenna. The antenna provided in the electronic device may be formed of a conductive material.

To make the design of the electronic device better, at least a portion of a housing of the electronic device may be formed of metal. For example, all or a portion of a rear housing of the electronic device may be formed of metal.

Nowadays, an outer housing of the electronic device is being used as an antenna. To improve the radiation performance of antenna, a portion of the metal of the outer housing may be removed, and a non-conductive material may be filled in a region in which the portion of the metal is removed.

The above information is presented as background information only to assist with an understanding of the disclosure. No determination has been made, and no assertion is made, as to whether any of the above might be applicable as prior art with regard to the disclosure.

SUMMARY

In the case where a metal housing is adopted for a side surface and a rear surface of the electronic device and a portion of the housing is filled with a non-conductive material, a plurality of antenna elements may be formed at the metal housing. A resonant frequency of an antenna may be determined by a length of a non-conductive material filled between a side housing and a rear housing.

Additional aspects will be set forth in part in the description which follows and, in part, will be apparent from the description, or may be learned by practice of the presented embodiments.

In the case where the antenna element is shorted to only a ground on a circuit board, the radiation performance of one antenna element identified by the non-conductive material may be reduced by another antenna element. Also, the rear housing and the side housing separated by the non-conductive material may not be effectively blocked, thereby causing a decrease in a swing width of a resonance frequency.

Aspects of the disclosure are to address at least the above-mentioned problems and/or disadvantages and to provide at least the advantages described below. Accordingly, an aspect of the disclosure is to provide a switching structure which improves the radiation performance of a metal housing of an electronic device, reduces a decrease in performance, and has a large swing width.

In accordance with an aspect of the disclosure, an electronic device is provided. The electronic device includes a housing that includes a slit, a first antenna element that extends along a portion of the housing, a second antenna element spaced apart from at least a portion of the first antenna element by the slit and extending along another portion of the housing, and a wireless communication circuit positioned inside the housing and is electrically connected to the first antenna element. The first antenna element may be electrically connected to the second antenna element.

In accordance with another aspect of the disclosure, an electronic device is provided. The electronic device includes a housing that includes a first plate, a second plate facing away from the first plate, and a side member surrounding a space between the first plate and the second plate. A substantial portion of the second plate may be formed of an electrically conductive material, and the side member may formed of an electrically conductive material and may include a first side extending in a first direction and having a first length, a second side extending in a second direction perpendicular to the first direction and having a second length shorter than the first length, a third side extending in parallel to the first side and having the first length, and a fourth side extending in parallel to the second side and having the second length. The side member may include an elongated slit that extends from a first point in the first side to a second point in the third side along a portion of the first side, the second side, and a portion of the third side, and a non-conductive material that fills the slit. The electronic device may further include a touchscreen display exposed through at least a portion of the first plate, a ground plane positioned in the housing in parallel to the second plate and electrically coupled to a third point of the first side at or near the first point, a wireless communication circuit positioned inside the housing and electrically coupled to a fourth point positioned in one of the portion of the first side, the second side, or the portion of the third side, at least one processor positioned inside the housing and electrically connected to the display and the communication circuit, an electrically conductive member electrically coupled between a fifth point and a sixth point of the side member, the fifth point and the sixth point being positioned between the third point and the fourth point, when viewed from above the second plate, and on opposite sides of the slit, and a switching element positioned inside the housing and is electrically connected to the fifth point and the sixth point.

In accordance with another aspect of the disclosure, an electronic device is provided. The electronic device includes a housing including a first plate, a second plate facing away from the first plate, and a side member surrounding a space between the first plate and the second plate. A substantial portion of the second plate may be formed of an electrically conductive material, and the side member may be formed of an electrically conductive material and may include a first side extending in a first direction and having a first length, a second side extending in a second direction perpendicular to the first direction and having a second length shorter than the first length, a third side extending in parallel to the first side and having the first length, and a fourth side extending in parallel to the second side and having the second length. The housing may further include an elongated slit formed between a portion of the side member and a portion of the second plate and extending from a first point in the first side to a second point in the third side along a portion of the first side, the second side, and a portion of the third side, and a non-conductive material that fills the slit. The electronic device may further include a touchscreen display exposed through at least a portion of the first plate, a ground plane positioned in the housing parallel to the second plate and electrically coupled to a third point of the first side at or near the first point, a wireless communication circuit positioned inside the housing and electrically coupled to a fourth point positioned in one of the portion of the first side, the second side, or the portion of the third side, a processor positioned inside the housing and electrically connected to the display and the communication circuit, and an electrically conductive member electrically coupled between a fifth point in the side member and a sixth point in the second plate. The fifth point and the sixth point may be positioned between the third point and the fourth point, when viewed from above the second plate, and on opposite sides of the slit. The electronic device may further include a switching element that is positioned inside the housing and electrically connected to the fifth point and the sixth point.

According to embodiments of the present disclosure, radiation performance of a metal housing may be improved by electrically connecting antenna elements.

According to embodiments of the present disclosure, an electronic device may transmit or receive signals in various frequency bands by using a switch which adjusts an open/close of an electrical path formed between the antenna elements.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
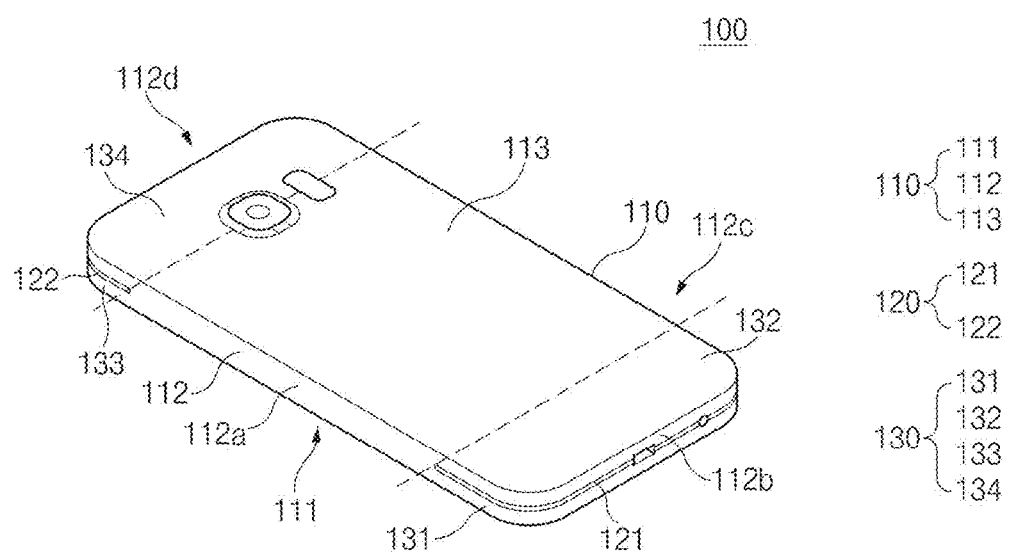
FIG. 1 is a perspective view of an electronic device according to an embodiment of the disclosure.

FIG. 1 is a perspective view of an electronic device according to an embodiment of the disclosure.

Referring to FIG. 1, an electronic device 100 according to an embodiment may be surrounded by a housing 110. The housing 110 of the electronic device 100 may include a first plate 111 of the electronic device 100, a second plate 113 facing away from the first plate 111, a side member 112 surrounding a space between the first plate 111 and the second plate 113.

The first plate 111 may include a touchscreen display exposed through at least a portion of the first plate 111. The first plate 111 may be, for example, a front surface of the electronic device 100. The first plate 111 may include a non-conductive region in at least a partial region.

At least a portion of the second plate 113 may include an electrically conductive material. The second plate 113 may be, for example, a rear surface of the electronic device 100. The second plate 113 may be, for example, at least a portion of a metal housing. A portion of the second plate 113 may include a ground region.

According to an embodiment of the disclosure, the side member 112 may include an electrically conductive material. The side member 112 may be, for example, at least a portion of the metal housing. The side member 112 may include a first side 112a to a fourth side 112d. The first side 112a may have a first length and may extend in a first direction. The second side 112b may have a second length and may extend in a second direction. The second length may be shorter than the first length. The second direction may be, for example, perpendicular to the first direction. The third side 112c may extend in parallel to the first side 112a and may have the first length. The fourth side 112d may be in parallel to the second side 112b and may have the second length.

The side member 112 may include at least one slit 120 extending along one region of at least one side. The at least one slit 120 may include, for example, a first slit 121, which extends from a first point in the first side 112a to a second point in the third side 112c along a portion of the first side 112a, the second side 112b, and a portion of the third side 112c, and a second slit 122 which extends along at least a portion of the fourth side 122d opposite to the second side 112b.

The at least one slit 120 may be filled with a non-conductive material. For example, the at least one slit 120 may be formed in a region in which a portion of the electrically conductive material of the housing 110 is removed.

According to an embodiment of the disclosure, the housing 110 may include a plurality of regions, some of which are spaced from each other by the at least one slit 120. For example, the housing 110 may include regions 130. The regions 130 may include first region 131, second region 132, third region 133, and fourth region 134. The first region 131 and the second region 132 are at least partially and physically spaced from each other. The housing 110 may include the third region 133 and the fourth region 134 which are at least partially and physically spaced from each other.

According to an embodiment of the disclosure, at least a portion of the first region 131 may be spaced from the second plate 113 by the first slit 121. At least a portion of the first region 131 may be spaced from at least a portion of the second region 132 by the first slit 121. According to an embodiment, the first region 131 may include a portion of the side member 112, and the second region 132 may include a portion of the second plate 113.

According to an embodiment of the disclosure, at least a portion of the third region 133 may be spaced from the second plate 113 by the second slit 122. At least a portion of the third region 133 may be spaced from at least a portion of the fourth region 134 by the second slit 122. According to an embodiment, the third region 133 may include a portion of the side member 112, and the fourth region 134 may include at least a portion of the second plate 113 or a portion of the side member 112.

According to an embodiment of the disclosure, a slit antenna using the slit 121 may be implemented by the first region 131 and the second region 132 distinguished by the slit 120. The first region 131 may be electrically connected to the second region 132 for the purpose of improving the radiation performance of an antenna using the housing 110 and transmitting or receiving a high-frequency signal with an external device by using a limited region. If an electrical signal is transferred to the first region 131, the first region 131 may operate as an antenna element. If the first region 131 and the second region 132 are electrically connected, the second region 132 may operate as an antenna element which assists an antenna element operating in the first region 131.

According to an embodiment of the disclosure, in the housing 110, a plurality of antenna elements may be formed by the at least one slit 120. For example, a first antenna element of the plurality of antenna elements may be formed in the first region 131, and a second antenna element may be formed in the second region 132. A third antenna element may be formed in the third region 133, and a fourth antenna element may be formed in the fourth region 134. The first antenna element and the second antenna element may be at least partially and physically spaced from each other depending on a shape of the first slit 121. The third antenna element and the fourth antenna element may be at least partially and physically spaced from each other depending on a shape of the second slit 122. By using at least one antenna element of the plurality of antenna elements, the electronic device 100 may transmit a signal to the external device or may receive a signal from the external device.

According to an embodiment of the disclosure, the plurality of antenna elements which are formed with the slit 120 interposed between the plurality of antenna elements may include a primary antenna element for transferring an electrical signal and a secondary antenna element assisting the primary antenna element. The first antenna element may operate as the primary antenna element, and the second antenna element which faces the first antenna element with respect to the first slit 121 may operate as the secondary antenna element. According to an embodiment, the third antenna element may operate as the primary antenna element, and the fourth antenna element which faces the third antenna element with respect to the second slit 122 may operate as the secondary antenna element.

According to an embodiment of the disclosure, antenna elements which are physically adjacent to each other may have a mutual influence on antenna characteristics. For example, while an electrical signal is transferred to the first antenna element, the second antenna element may have an influence on an antenna characteristic of the first antenna element, thereby reducing the radiation performance. According to an embodiment, adjacent antenna elements may be electrically connected to reduce a decrease in radiation performance. For example, the first antenna element may be electrically connected to the second antenna element. If the first antenna element is electrically connected to the second antenna element, a current may be induced at the second antenna element, and the radiation performance of the whole antenna may be improved.

According to an embodiment of the disclosure, if the first antenna element is electrically connected to the second antenna element, an electrical path connecting the first antenna element and the second antenna element may make a length of a slit short, and thus, a target frequency of the antenna may become higher. The first antenna element may be electrically connected to the second antenna element for the purpose of transmitting or receiving a signal in a high-frequency band by using the housing 110 of a limited region.

According to an embodiment, by using an electrical path formed by the at least one slit 120, the electronic device 100 may transmit a signal of a target frequency to the external device or may receive the signal of the target frequency from the external device.

The electronic device 100 may selectively make electrical connection between antenna elements depending on a target frequency of a signal to be transmitted or received. For example, the electronic device 100 may selectively connect the first antenna element to the second antenna element.

In the following embodiment of the disclosure, the first region 131 may be referenced as a first antenna element 131, and the second region 132 may be referenced as a second antenna element 132. In the following embodiment, the third region 133 may be referenced as a third antenna element 133, and the fourth region 134 may be referenced as a fourth antenna element 134.

Figure 2:
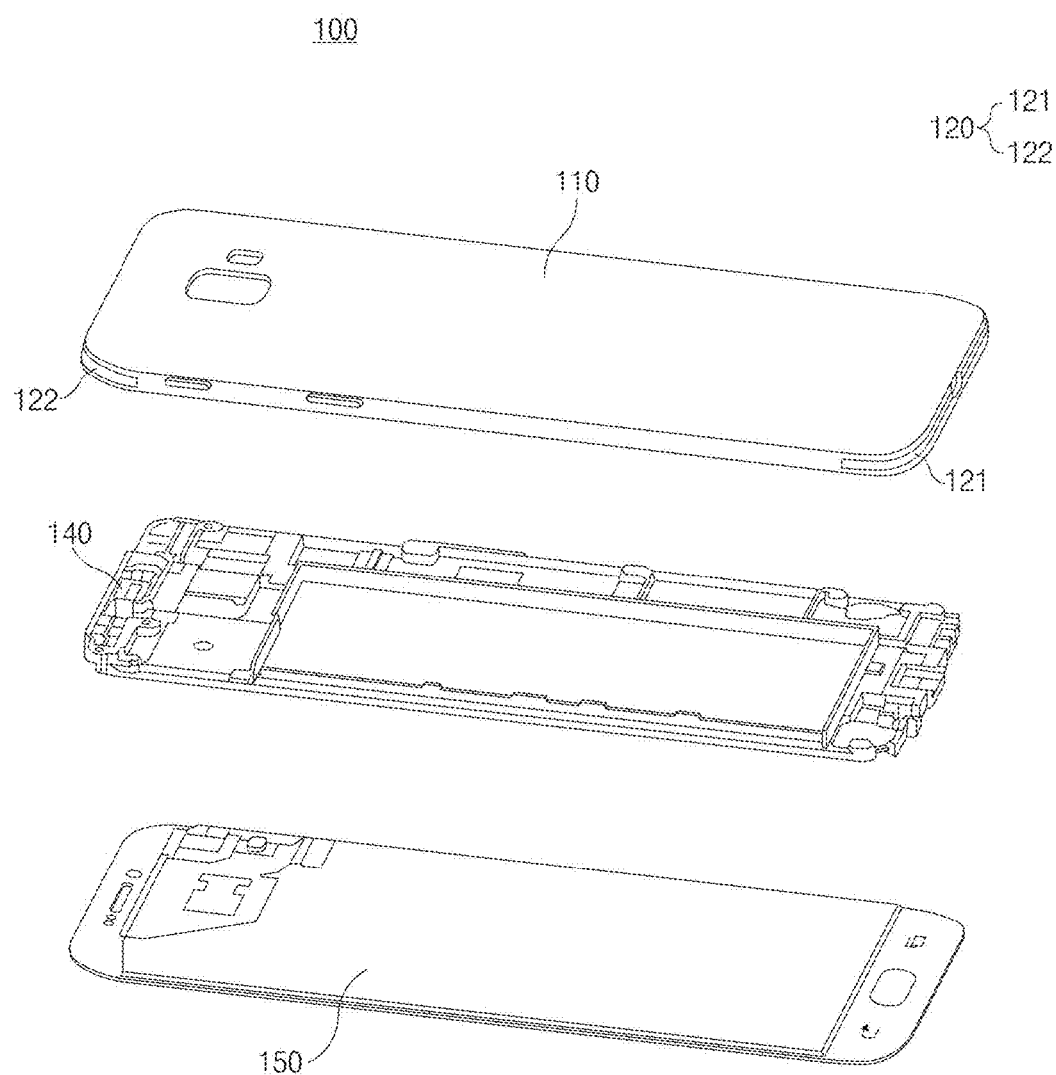
FIG. 2 is an exploded perspective view of an electronic device according to an embodiment of the disclosure.

FIG. 2 is an exploded perspective view of an electronic device according to an embodiment of the disclosure.

Referring to FIG. 2, the electronic device 100 according to an embodiment may include the housing 110, the slit 120, a support member 140, and a display module 150. For convenience of description, a description that is given with reference to FIG. 1 will not be repeated here.

According to an embodiment of the disclosure, the support member 140 may be positioned inside the housing 110. The support member 140 may be integrally formed with a side member (e.g., the side member 112 of FIG. 1). For example, the support member 140 may be coupled with components of the electronic device 100, such as the display module 150, a printed circuit board, a flexible printed circuit board, a camera module, a receiver, and the like, and may support at least a part of the components. At least a portion of the support member 140 may include metal. For example, the support member 140 may be formed of magnesium alloy. The support member 140 may be positioned in a space defined by the housing 110.

According to an embodiment of the disclosure, the display module 150 may include a display panel, a display driver integrated circuit, a cover glass, and the like. The display module 150 according to an embodiment may be exposed through a first plate (e.g., the first plate 111 of FIG. 1) of the housing 110. The display module 150 according to an embodiment may be a touchscreen display.

Figure 3:
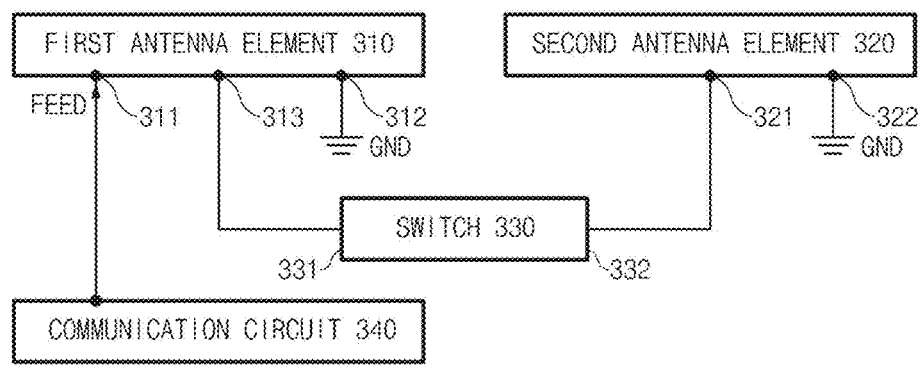
FIG. 3 illustrates a configuration of an antenna included in an electronic device according to an embodiment of the disclosure.
Figure 3:
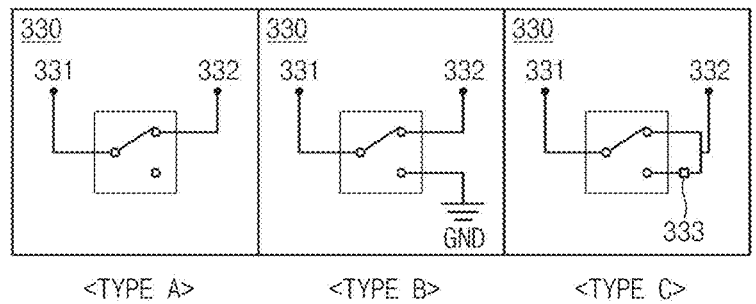

FIG. 3 illustrates a configuration of an antenna included in an electronic device according to an embodiment of the disclosure.

According to an embodiment of the disclosure, an electronic device 300 (e.g., the electronic device 100 of FIG. 1 or the electronic device 100 of FIG. 2) may transfer an electrical signal to a first antenna element 310 (e.g., the first antenna element 131 of FIG. 1) and may selectively connect the first antenna element 310 and a second antenna element 320 (e.g., the second antenna element 132 of FIG. 1). According to an embodiment, the first antenna element 310 and the second antenna element 320 may be the third antenna element 133 and the fourth antenna element 134 of FIG. 1.

Referring to FIG. 3, the electronic device 300 may include the first antenna element 310, the second antenna element 320, a switch 330, and a communication circuit 340. A configuration illustrated in FIG. 3 is an exemplary configuration, and the electronic device 300 may be variously changed or modified according to various embodiments of the disclosure. For example, the electronic device 300 may include a processor 1920 of FIG. 19.

According to an embodiment of the disclosure, the first antenna element 310 may interact with the second antenna element 320, with a slit (e.g., the slit 120 of FIG. 1) interposed between the first antenna element 310 and the second antenna element 320. The electronic device 300 may use the first antenna element 310 and/or the second antenna element 320 for the purpose of transmitting or receiving a signal of a target frequency.

The first antenna element 310 may radiate an electrical signal of the communication circuit 340 to an external space. According to an embodiment, the first antenna element 310 may be connected to the communication circuit 340 through a first point 311. The first point 311 according to an embodiment may be positioned in a portion of any one of a first plate (e.g., the first plate 111 of FIG. 1), a second plate (e.g., the second plate 113 of FIG. 1), or a side member (e.g., the side member 112 of FIG. 1).

According to an embodiment of the disclosure, the first point 311 which is a feeding part may be connected to the communication circuit 340 through an electrically conductive member which extends from a printed circuit board or an antenna element or is connected to the printed circuit board or the antenna element. According to an embodiment, the first point 311 may be connected to the communication circuit 340 through a matching circuit and a transmission line. For example, the electrically conductive member may be a C-clip, a metal extension, a screw, a spring, or the like.

According to an embodiment of the disclosure, a second point 312 of the first antenna element 310 may be coupled to a ground part. In various embodiments, the second point 312 may be electrically coupled to, for example, a ground plane. For example, the ground plane may be positioned inside a housing and may be formed on a printed circuit board.

In various embodiments of the disclosure, the first point 311 and the second point 312 may be positioned adjacent to a slit. The second point 312 according to an embodiment may be positioned adjacent to an end point of a first side (e.g., the first side 112a of FIG. 1) or a third side (e.g., the third side 112c of FIG. 1). For example, the second point 312 may be positioned adjacent to the first point 311 in the first side (e.g., the first side 112a) of a side member (e.g., the side member 112 of FIG. 1).

According to an embodiment of the disclosure, the second antenna element 320 may be connected to the first antenna element 310. The second antenna element 320 may operate as a portion of the antenna by the connection with the first antenna element 310. The second antenna element 320 may be distinguished from the first antenna element 310 by a slit.

According to an embodiment of the disclosure, a first point 321 of the second antenna element 320 may be electrically coupled to a third point 313 of the first antenna element 310. An electrical path may be formed between the first point 321 of the second antenna element 320 and the third point 313 of the first antenna element 310. According to an embodiment, the electronic device 300 may include an electrically conductive member connecting the first point 321 and the third point 313.

According to an embodiment of the disclosure, the second antenna element 320 may be electrically connected to a ground part. For example, the second antenna element 320 may be connected to the ground part through a second point 322. According to an embodiment, the ground part may be positioned in a printed circuit board and may be connected to a ground plane formed on the printed circuit board.

According to an embodiment of the disclosure, the third point 313 of the first antenna element 310 may be interposed between the first point 311 and the second point 312 of the first antenna element 310.

According to an embodiment of the disclosure, the first point 321 of the second antenna element 320 and the third point 313 of the first antenna element 310 may face each other while a slit is interposed between the first antenna element 310 and the second antenna element 320.

According to an embodiment of the disclosure, an electrical length of an antenna determined by a slit may be changed by connecting the third point 313 of the first antenna element 310 and the first point 321 of the second antenna element 320. For example, an electrical length of a slit may become shorter due to the connection of the points 313 and 321. In the case of establishing an electrical path between the first antenna element 310 and the second antenna element 320, the electronic device 300 may transmit or receive a signal of a higher frequency than before the electrical path is established.

According to an embodiment of the disclosure, a frequency switching width may widen by selectively connecting the first antenna element 310 and the second antenna element 320 by using the switch 330. According to an embodiment, the switch 330 may selectively connect the first antenna element 310 and the second antenna element 320. The switch 330 may adjust an open/close of the electrical path. The switch 330 may include, for example, various types of switches such as a single pole single throw (SPST) switch, a single pole double throw (SPDT) switch, a 3 pole 3 throw (3P3T) switch, a single pole four throw (SP4T) switch, a microelectromechanical system (MEMS) switch, or the like. According to an embodiment, the switch 330 may include a switch and/or an element such as a tunable element or a tuner. In various embodiments, the switch 330 may operate as a radio frequency (RF) port. In the following description, the switch 330 may be referenced as a switching element.

According to an embodiment of the disclosure, the switch 330 may be connected to a processor. According to an embodiment, the switch 330 may be positioned on a printed circuit board in the housing 110.

According to an embodiment of the disclosure, the processor may control the open/close of the switch 330 for the purpose of adjusting a target frequency for signal transmission and reception with an external device. In various embodiments, the processor may be positioned on the printed circuit board.

According to an embodiment of the disclosure, for connection with the first antenna element 310 or the second antenna element 320, the switch 330 may be electrically coupled to the third point 313 of the first antenna element 310 or the first point 321 of the second antenna element 320. According to an embodiment, the switch 330 may be coupled to one point 331 for connection with the third point 313 of the first antenna element 310 and may be coupled to any other point 332 for connection with the first point 321 of the second antenna element 320.

According to an embodiment of the disclosure, the switch 330 may be coupled to the third point 313 of the first antenna element 310 through an electrically conductive member. The point 331 coupled to the switch 330 may be electrically coupled to the third point 313 through the electrically conductive member. The switch 330 may be coupled to the other point 332 through the electrically conductive member and may be coupled to the first point 321 of the second antenna element 320. The electrically conductive member may be, for example, a C-clip, a metal extension, a screw, or a spring.

According to various embodiments of the disclosure, the printed circuit board may include a fill cut region. For example, the fill cut region may be a region where an insulating material is exposed by removing a conductive layer from the printed circuit board.

According to an embodiment of the disclosure, the first antenna element 310 and the second antenna element 320 may be connected on the fill cut region. For example, a middle wiring which connects the third point 313 of the first antenna element 310 and the first point 321 of the second antenna element 320 may be positioned in the fill cut region. The radiation performance of the second antenna element 320 may be increased by connecting the first antenna element 310 and the second antenna element 320 in the fill cut region.

According to an embodiment of the disclosure, the third point 313 of the first antenna element 310 may be coupled to the switch 330 through the fill cut region. For example, the point 331 coupled to the switch 330 may be positioned in the fill cut region. The first point 321 of the second antenna element 320 may be coupled to the switch 330 through the fill cut region. For example, the point 332 coupled to the switch 330 may be positioned in the fill cut region.

In various embodiments of the disclosure, at least a portion of the switch 330 may be positioned in the fill cut region on the printed circuit board or may be positioned adjacent to the fill cut region. For example, in an embodiment, the points 331 and 332 coupled to the switch 330 may be positioned on the fill cut region. In various embodiments, RF ports of the switch 330 may be present in the fill cut region. For example, the first antenna element 310 may be connected to an RF port of the switch 330 through the point 332 positioned in the fill cut region. The second antenna element 320 may be connected to an RF port of the switch 330 through the point 331 positioned in the fill cut region.

According to various embodiments of the disclosure, the switch 330 may have various structures. Referring to FIG. 3, according to one embodiment (TYPE A), the switch 330 may establish or may not establish connection between the points 331 and 332 for connecting the first antenna element 310 and the second antenna element 320.

According to another embodiment of the disclosure (TYPE B), the switch 330 may control connection of the first antenna element 310, an antenna element different from the second antenna element 320, or a ground part.

According to another embodiment of the disclosure (TYPE C), the switch 330 may establish or may not establish the connection between the first antenna element 310 and the second antenna element 320, and may select whether to use a matching element 333 upon establishing the connection. The matching element 333 may include, for example, an inductor "L" and/or a capacitor "C". The matching element 333 may be a filter circuit which passes only a specific frequency. According to various embodiments, the switch 330 may be electrically connected to the ground part.

According to an embodiment of the disclosure, the communication circuit 340 may transfer an electrical signal to the first antenna element 310. The communication circuit 340 may transfer an electrical signal to the first point 311 of the first antenna element 310. If the first antenna element 310 and the second antenna element 320 are connected by the switch 330, at least a portion of the electrical signal which the communication circuit 340 transfers to the first antenna element 310 may be transferred to the second antenna element 320. By using the first antenna element 310 and the second antenna element 320, the communication circuit 340 may transmit a signal to the external device or may receive a signal from the external device. The communication circuit 340 may include a front end module. The first point 311 of the first antenna element 310 may be electrically connected to the front end module. In various embodiments, the communication circuit 340 may be positioned on a printed circuit board. According to various embodiments of the disclosure, the communication circuit 340 may include a wireless communication circuit which transmits or receives a wireless signal.

The electronic device 300 of FIG. 3 may be variously changed or modified according to various embodiments of the disclosure. For example, the electronic device 300 may further include a part of components to be described with reference to FIGS. 4 to 6 or may include a combination of some of the components.

Figure 4:
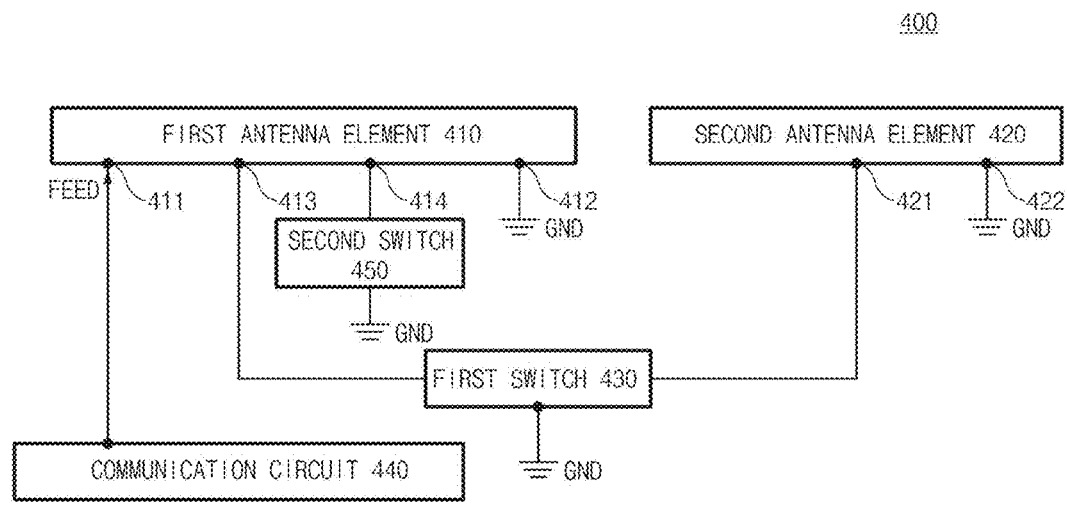
FIG. 4 illustrates a configuration of an antenna included in an electronic device according to an embodiment of the disclosure.

FIG. 4 illustrates a configuration of an antenna included in an electronic device according to an embodiment of the disclosure.

Referring to FIG. 4, an electronic device 400 (e.g., the electronic device 100 of FIG. 1, the electronic device 100 of FIG. 2, or the electronic device 300 of FIG. 3) according to an embodiment may include a first antenna element 410, a second antenna element 420, a first switch 430, a communication circuit 440, and a second switch 450. The electronic device 400 may include a configuration that is the same as or similar to the configuration of the electronic device 300 of FIG. 3. For example, the first switch 430 and/or the second switch 450 may be the same as or similar to the switch 330 of FIG. 3. For example, one point and another point of the first switch 430 and/or the second switch 450 may be positioned on the fill cut region. The first antenna element 410 and the second antenna element 420 may be the same as or similar to the first antenna element 310 and the second antenna element 320 of FIG. 1. For convenience of description, a description that is given with reference to FIG. 3 will not be repeated here.

Referring to FIG. 4, the second antenna element 420 may include a first point 421 and a second point 422. The second point 422 of the second antenna element 420 may be coupled to a ground part. In an embodiment, the second point 422 of the second antenna element 420 may be positioned at a point spaced from a slit (e.g., the slit 120 of FIG. 1 or the slit 120 of FIG. 2) on the second antenna element 420. The second antenna element 420 may perform a ground role by connecting the second antenna element 420 to the ground part. In various embodiments, the ground part may be positioned on a printed circuit board or may be positioned in another region except for the printed circuit board. For example, the second point 422 of the second antenna element 420 may be coupled to a ground region formed along a partial region of a housing (e.g., the housing 110 of FIG. 1).

According to an embodiment of the disclosure, the first antenna element 410 may be electrically connected to the ground part, and may include a first point 411, a second point 412, a third point 413, and a fourth point 414. The fourth point 414 of the first antenna element 410 may be coupled to the ground part in a state where the second point 412 of the first antenna element 410 is coupled to the ground part. The fourth point 414 of the first antenna element 410 may be selectively connected to the ground part.

According to an embodiment of the disclosure, the second switch 450 may selectively connect the fourth point 414 of the first antenna element 410 to the ground part. The second switch 450 may adjust an open/close of an electrical path connecting the fourth point 414 of the fourth antenna element 410 and the ground part. In an embodiment, in the case where the first switch 430 is closed, the second switch 450 may be closed. If the second switch 450 is closed, the fourth point 414 of the first antenna element 410 may be coupled to the ground part. The radiation performance of an antenna may be improved by additionally connecting the first antenna element 410 to a ground.

In another embodiment of the disclosure, in the case where the first switch 430 is opened, the second switch 450 may be closed. For example, in the case where the second switch 450 is closed in a state where the first switch 430 is not closed, the ground part connected to the second switch 450 may perform a role of adjusting an electrical length of an antenna. According to various embodiments of the disclosure, the switch 450 may be connected to a processor.

Figure 5:
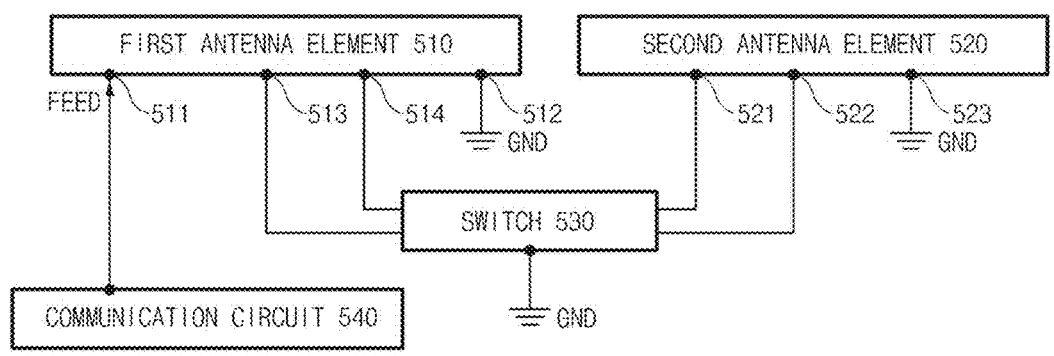
FIG. 5 illustrates a configuration of an antenna included in an electronic device according to an embodiment of the disclosure.

FIG. 5 illustrates a configuration of an antenna included in an electronic device according to an embodiment of the disclosure.

According to an embodiment of the disclosure, an electronic device 500 (e.g., the electronic device 100 of FIG. 1 or the electronic device 100 of FIG. 2) may electrically connect a first antenna element 510 and a second antenna element 520 to adjust a length of a slit (e.g., the slit 120 of FIG. 1 or the slit 120 of FIG. 2). The electronic device 500 may variously adjust a length of a slit by adjusting a connection point of the first antenna element 510 and the second antenna element 520. The electronic device 500 may adjust an electrical length of an antenna by selecting locations of connection points connecting the first antenna element 510 and the second antenna element 520. Referring to FIG. 5, the electronic device 500 may include the first antenna element 510, the second antenna element 520, a switch 530, and a communication circuit 540. The first antenna element 510, the second antenna element 520, and the communication circuit 540 may be the same as or similar to the first antenna element 310, the second antenna element 320, and the communication circuit 340 of FIG. 1. For convenience of description, a description which is given above with regard to components of the electronic device 500 will not be repeated here.

According to an embodiment of the disclosure, the first antenna element 510 and/or the second antenna element 520 may include a plurality of connection points for the purpose of variously adjusting a length of a slit. Any one element of the first antenna element 510 or the second antenna element 520 may include a plurality of connection points for connection with the remaining element.

Referring to FIG. 5, the first antenna element 510 and the second antenna element 520 may include a plurality of connection points. The connection point of the first antenna element 510 may be coupled to the connection point of the second antenna element 520. The first antenna element 510 and the second antenna element 520 may be connected through a plurality of electrical paths. For example, the plurality of electrical paths may be formed through different connection points.

In the following description, the first antenna element 510 may include a plurality of connection points 513 and 514, and the second antenna element 520 may include a plurality of connection points 521 and 522. The case where the plurality of connection points include two connection points will be described below, but is only one exemplification. For example, each antenna element may include less or more connection points.

According to an embodiment of the disclosure, a first point 511 and a second point 512 of the first antenna element 510 may be coupled to the communication circuit 540 and a ground part, respectively. The third point 513 and the fourth point 514 of the first antenna element 510 may be points for connection with the second antenna element 520. A first point 521 and a second point 522 of the first antenna element 520 may be points for connection with the first antenna element 510.

According to an embodiment of the disclosure, an electrical length connecting the third point 513 of the first antenna element 510 and the first point 521 of the second antenna element 520 may be referenced as a first electrical path. For another example, an electrical length connecting the fourth point 514 of the first antenna element 510 and the second point 522 of the second antenna element 520 may be referenced as a second electrical path. For another example, an electrical length connecting the third point 513 of the first antenna element 510 and the second point 522 of the second antenna element 520 may be referenced as a third electrical path. For another example, an electrical length connecting the fourth point 514 of the first antenna element 510 and the first point 521 of the second antenna element 520 may be referenced as a fourth electrical path.

According to an embodiment of the disclosure, the switch 530 may adjust an open/close of an electrical path between the first antenna element 510 and the second antenna element 520. In the case where the switch 530 is closed, the first antenna element 510 and the second antenna element 520 may be connected to each other. The switch 530 may select one of the first electrical path to the fourth electrical path. In the case where the switch 530 is opened, the first antenna element 510 and the second antenna element 520 may not be connected to each other. According to an embodiment of the disclosure, at least one of the third point 513 or the fourth point 514 of the first antenna element 510 may be coupled to the ground part. For example, the switch 530 may connect the third point 513 or the fourth point 514 to the ground part. According to an embodiment, one point and the other point of the switch 530 may be positioned on the fill cut region. The one point or the other point may be coupled to the third point 513 or the fourth point 514 of the first antenna element 510.

According to an embodiment of the disclosure, the switch 530 may be electrically connected to a ground plane. According to an embodiment, the ground plane may be formed on the printed circuit board.

The communication circuit 540 may support a plurality of frequency bands depending on an operation of the switch 530. The communication circuit 540 may transmit or receive a signal of a selected frequency with the external device.

According to an embodiment of the disclosure, the second antenna element 520 may be connected to the ground part. For example, a third point 523 of the second antenna element 520 may be electrically coupled to a ground plane formed on a board or to a ground region defined on a second plate of the electronic device 500.

Figure 6:
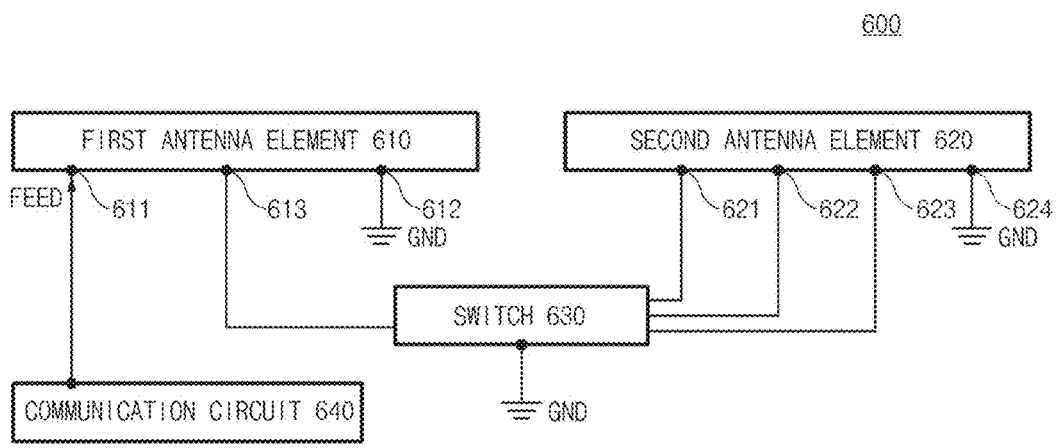
FIG. 6 illustrates a configuration of an antenna included in an electronic device according to an embodiment of the disclosure.

FIG. 6 illustrates a configuration of an antenna included in an electronic device according to an embodiment of the disclosure.

Referring to FIG. 6, an electronic device 600 (e.g., the electronic device 100 of FIG. 1 or the electronic device 100 of FIG. 1) may include a first antenna element 610, a second antenna element 620, a switch 630, and a communication circuit 640. The first antenna element 610, the second antenna element 620, and the communication circuit 640 may be the same as or similar to the first antenna element 310, the second antenna element 320, and the communication circuit 340 of FIG. 3. For convenience of description, a description which is given above with regard to components of the electronic device 600 will not be repeated here.

Referring to FIG. 6, any one of the first antenna element 610 or the second antenna element 620 may include one connection point, and the other thereof may include a plurality of connection points which may be connected to the one connection point. The case where the first antenna element 610 includes one connection point is illustrated in FIG. 6, but the second antenna element 620 may include one connection point.

According to an embodiment of the disclosure, the first antenna element may include a first point 611, a second point 612, and a third point 613. The third point 613 of the first antenna element 610 may be coupled to any one of a first point 621, a second point 622, or a third point 623 of the second antenna element 620. A third point 613 of the first antenna element 610 may form a first electrical path with the first point 621 of the second antenna element 620, may form a second electrical path with the second point 622, or may form a third electrical path with the third point 623.

According to an embodiment of the disclosure, the second antenna element 620 may assist the first antenna element 610. A fourth point 624 of the second antenna element 620 may be coupled to a ground part.

According to an embodiment of the disclosure, the switch 630 may selectively establish any one path of the first electrical path to the third electrical path, or may electrically connect the third point 613 of the first antenna element 610 to the ground part. For example, if the switch 630 is opened, the switch 630 may not be coupled to any point. For another example, an electrical length of an antenna, which is implemented with the first antenna element 610 and the second antenna element 620, may vary with an operation of the switch 630. According to an embodiment, one point and the other point of the switch 630 may be positioned on the fill cut region.

Figure 7:
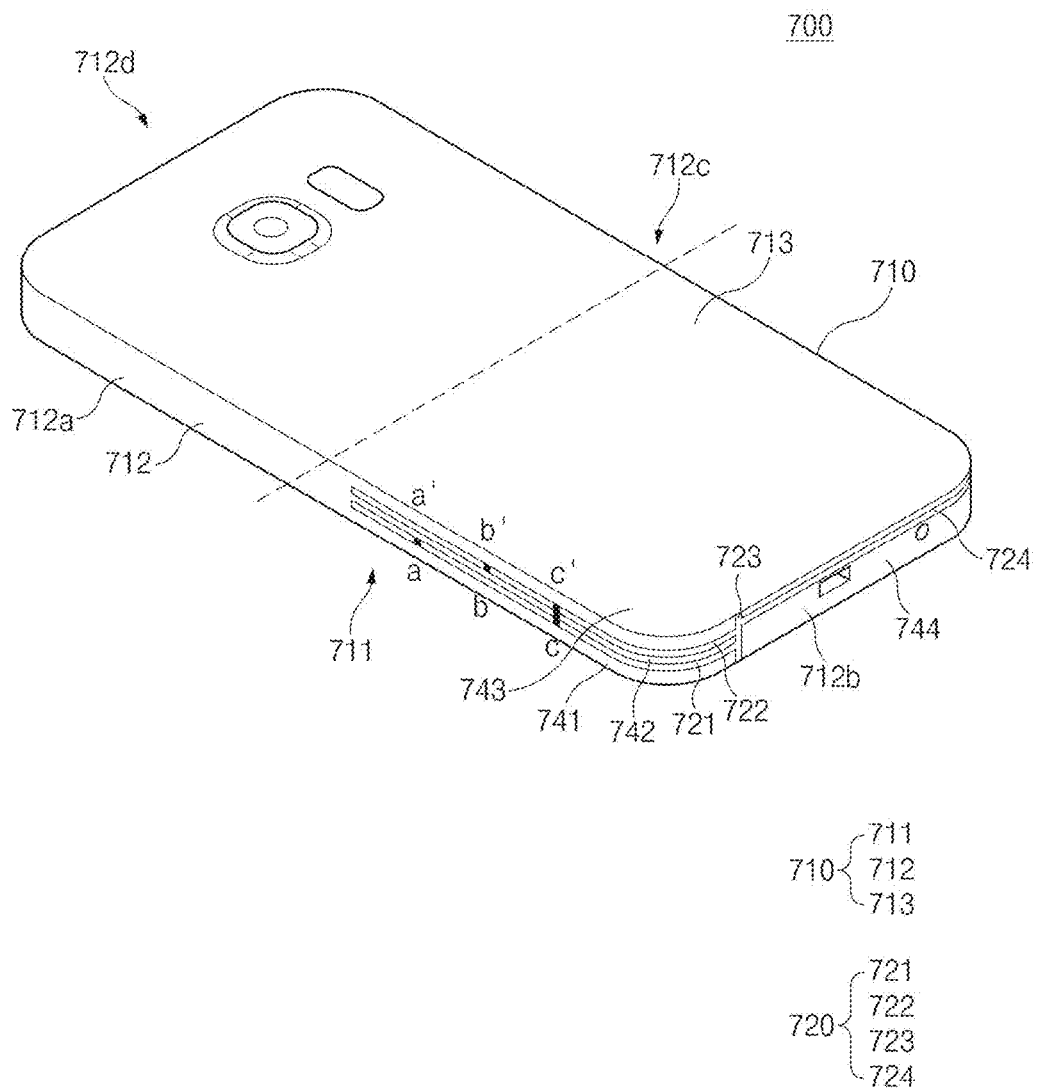
FIG. 7 is a perspective view of an electronic device according to an embodiment of the disclosure.

FIG. 7 is a perspective view of an electronic device according to an embodiment of the disclosure.

Referring to FIG. 7, an electronic device 700 (e.g., the electronic device 100 of FIG. 1 or the electronic device 100 of FIG. 2) may be surrounded by a housing 710. The housing 710 may include a first plate 711 of the electronic device 700, a second plate 713 facing away from the first plate 711, a side member 712 surrounding a space between the first plate 711 and the second plate 713. The housing 710 of the electronic device 700 may be the same as or similar to the housing 110 of the electronic device 100 of FIG. 1. For convenience of description, a description which is given above with regard to components of the electronic device 700 will not be repeated here.

According to an embodiment of the disclosure, the side member 712 of the electronic device 700 may include a plurality of slits 720 extending along a portion of at least one side. For example, one of the plurality of slits 720 may extend from a first point in a first side 712a of the side member 712 to a second point in a second side 712b. The plurality of slits 720 may be arranged in parallel, for example. In the following description, the first side 712a, second side 712b, third side 712c, and fourth side 712d may be the same as or similar to the first side 112a to the fourth side 112d described with reference to FIG. 1.

According to an embodiment of the disclosure, the plurality of slits 720 may include a first slit 721 and a second slit 722. At least a portion of a first region 741 of the side member 712 may be spaced from a second region 742 of the side member 712 by the first slit 721. At least a portion of the second region 742 of the side member 712 may be spaced from at least a portion of a third region 743 by the second slit 722. According to an embodiment, the third region 743 may include a portion of the second plate 713 and/or a portion of the side member 712.

According to an embodiment of the disclosure, the plurality of slits 720 may include a third slit 723 which crosses the side member 712 toward the second plate 713 from the first plate 711. The third slit 723 may be connected to the remaining slits 721, 722, and 724. For example, an end point, which is positioned in the second side 712b, from among end points of the first slit 721 may be physically coupled to a non-conductive material of the third slit 723. According to an embodiment of the disclosure, the third slit 723 may be a segment. The third slit 723 may be referenced as a vertical slit.

According to an embodiment of the disclosure, the plurality of slits 720 may include a plurality of slits facing each other, with the third slit 723 interposed between the plurality of slits 720. According to an embodiment, the third slit 723 may be interposed between the first slit 721 or the second slit 722 and a fourth slit 724.

According to an embodiment of the disclosure, a plurality of antenna elements may be formed by the plurality of slits 720. A first antenna element may be formed along the first region 741. A second antenna element may be formed along the second region 742. A third antenna element may be formed along the third region 743. According to an embodiment, at least the second plate 713 may include a fourth region 744 spaced from the first region 741 to the third region 743 by the third slit 723 and the fourth slit 724. A fourth antenna element may be formed in the fourth region 744 according to an embodiment. According to an embodiment, the fourth antenna element may operate as an antenna which is independent of at least one of the first antenna element to the third antenna element. At least a portion of the fourth antenna element may be physically spaced from the third antenna element by the fourth slit 724.

By using an antenna including the plurality of antenna elements, the electronic device 700 may transmit a signal to an external device or may receive a signal from the external device.

According to an embodiment of the disclosure, at least one antenna element may include a primary antenna element and a secondary antenna element. In the case where the electronic device 700 transfers an electrical signal to the first antenna element through a communication circuit, the first antenna element may be used as the primary antenna element. If the electronic device 700 transfers an electrical signal to the first antenna element through the communication circuit, at least one of the second antenna element or the third antenna element may be used as the secondary antenna element.

According to an embodiment of the disclosure, the second antenna element and/or the third antenna element may assist the first antenna element. For example, in the case of connecting the first antenna element to the third antenna element, if the electronic device 700 transfers an electrical signal to the first antenna element through the communication circuit, a current may be induced at the third antenna element, and thus, the third antenna element may operate as a part of the antenna. The connection of the first antenna element to another antenna element may make the radiation performance of the antenna better and an electrical length of the antenna shorter, and thus, the electronic device 700 may transmit or receive a signal having a frequency in a high band to or from an external device.

According to an embodiment of the disclosure, the first antenna element may be electrically connected to the second antenna element. A point "c" of the first antenna element may be coupled to a point "c'" of the second antenna element. The point "a" and the point "a'" may face each other, with the first slit 721 interposed between the points "a" and "a'". The point "a" and the point "a'" may be positioned adjacent to the first slit 721. Below, an electrical path between the first antenna element and the second antenna element may be referenced as a first electrical path.

According to an embodiment of the disclosure, the second antenna element may be electrically connected to the third antenna element. A point "b" of the second antenna element may be coupled to a point "b''" of the third antenna element. The point "b" and the point "b'" may face each other, with the second slit 722 interposed between the points "b" and "b'". The point "b" and the point "b'" may be positioned adjacent to the second slit 722. Below, an electrical path between the second antenna element and the third antenna element may be referenced as a second electrical path.

According to an embodiment of the disclosure, the first antenna element may be electrically connected to the third antenna element. A point "c" of the first antenna element may be coupled to a point "c''" of the third antenna element. The point "c" and the point "c'" may face each other, with the first slit 721 and the second slit 722 interposed between the points "c" and "c'". The point "c" may be adjacent to the first slit 721, and the point "c'" may be positioned adjacent to the second slit 722. Below, an electrical path between the first antenna element and the third antenna element may be referenced as a third electrical path.

Figure 8:
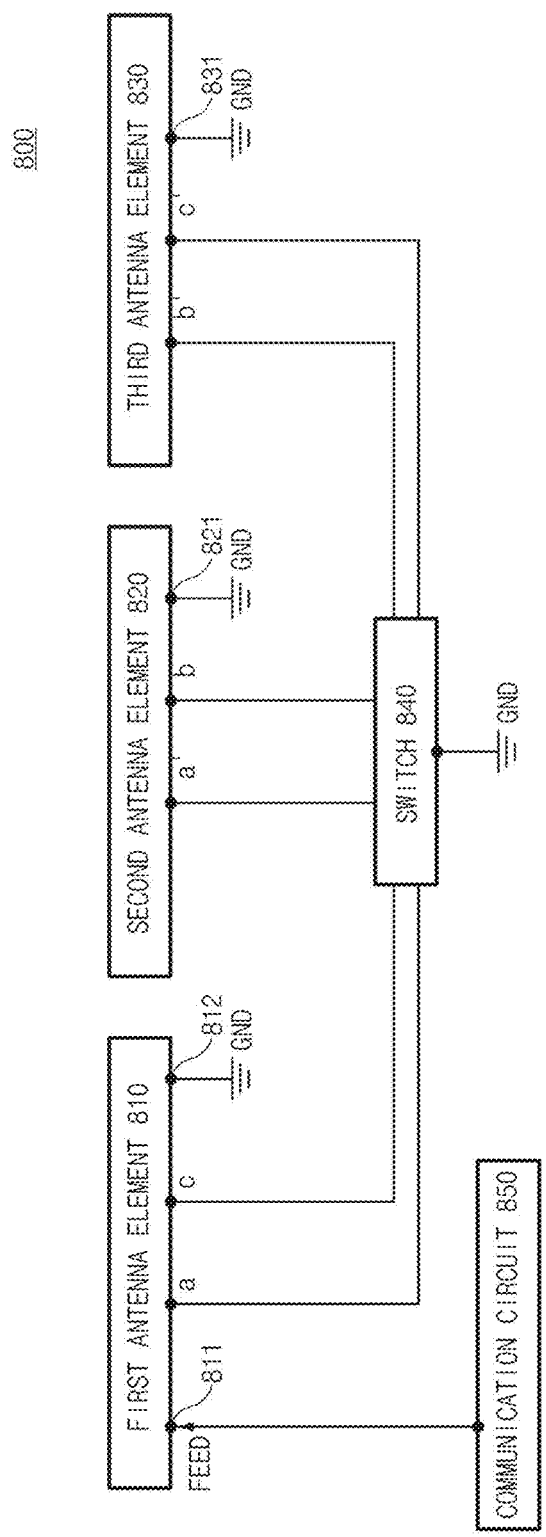
FIG. 8 illustrates a configuration of an antenna included in an electronic device according to an embodiment of the disclosure.

FIG. 8 illustrates a configuration of an antenna included in an electronic device according to an embodiment of the disclosure.

According to an embodiment of the disclosure, an electronic device 800 (e.g., the electronic device 700 of FIG. 7) may transfer an electrical signal to a first antenna element, and may transmit or receive a signal at least one of a first electrical path, a second electrical path, or a third electrical path. The electrical paths may be the same as or similar to the first electrical path, the second electrical path, or the third electrical path described with reference to FIG. 7.

Referring to FIG. 8, the electronic device 800 may include a first antenna element 810, a second antenna element 830, a third antenna element 830, a switch 840, and/or a communication circuit 850. A configuration of the electronic device 800 may be the same as or similar to the configuration of the electronic device 700 of FIG. 7. For example, the first antenna element 810 may be substantially the same as the first region 741 of FIG. 7, the second antenna element 820 may be substantially the same as the second region 742 of FIG. 7, or the third antenna element 830 may be substantially the same as the third region 743 of FIG. 7.

According to an embodiment of the disclosure, the first antenna element 810 may radiate an electrical signal to an external space. The first antenna element 810 may be connected to the communication circuit 850 through a first point 811. A second point 812 of the first antenna element 810 may be coupled to a ground part. According to various embodiments, the ground part may be positioned on the printed circuit board. The first antenna element 810 may be electrically connected to the second antenna element 820 or the third antenna element 830 through the point "a" and the point "c". According to various embodiments, when viewed from above a first plate (e.g., the first plate 711 of FIG. 7), the point "a" and the point "c" may be interposed between the first point 811 and the second point 812.

According to an embodiment of the disclosure, the second antenna element 820 may be electrically connected to the first antenna element 810 and/or the third antenna element 830, and may include a point 821. For example, the second antenna element 820 may be electrically connected to the first antenna element 810 through the point "a'". In the case where the second antenna element 820 is connected to the first antenna element 810, the second antenna element 820 may operate as a portion of an antenna including the first antenna element 810. The second antenna element 820 may be distinguished from the first antenna element 810 by a slit (e.g., the first slit 721 of FIG. 7).

According to an embodiment of the disclosure, the third antenna element 830 may be electrically connected to the first antenna element 810 and/or the second antenna element 820, and may include a point 831. The point "c'" of the third antenna element 830 may form the third electrical path with the point "c" of the first antenna element 810. The point "b'" of the third antenna element 830 may form the second electrical path with the point "b" of the second antenna element 820. The third antenna element 830 may be distinguished from the first antenna element 810 and the second antenna element 820 by a slit (e.g., the second slit 722 of FIG. 7).

According to an embodiment of the disclosure, the switch 840 may connect or may not connect the first electrical path, the second electrical path, and/or the third electrical path. For example, in the case where the switch 840 is opened, a current may not almost flow, and thus, the second antenna element 820 and the third antenna element 830 may not operate as an element of an antenna. In the case where the first antenna element 810 is not connected to the second antenna element 820 or the third antenna element 830, the switch 840 may connect the first antenna element to a ground part. In the case where the switch 840 is closed, the switch 840 may select the first electrical path, the second electrical path, and/or the third electrical path. The switch 840 may select an electrical path in various combinations. For example, the switch 840 may establish the first electrical path, or may establish the first electrical path and the third electrical path.

According to an embodiment of the disclosure, the switch 840 may be positioned on a printed circuit board in a housing. The switch 840 may be connected to each antenna element through an electrically conductive member. The electrically conductive member may be, for example, a C-clip.

According to an embodiment of the disclosure, an electrical path may be established on the fill cut region. For example, a portion of the switch 840 may be positioned in the fill cut region on the printed circuit board or may be adjacent to the fill cut region.

According to an embodiment of the disclosure, the communication circuit 850 may transfer an electrical signal to the first antenna element 810. The communication circuit 850 may transfer an electrical signal to the first point 811 of the first antenna element 810. If the first antenna element 810 and the second antenna element 820 are connected by the switch 840, at least a portion of the electrical signal which the communication circuit 850 transfers to the first antenna element 810 may be transferred to the second antenna element 820. In this case, by using an electrical path by the first antenna element 810 and the second antenna element 820, the communication circuit 850 may transmit a signal to an external device or may receive a signal from the external device.

The configuration of the antenna of the electronic device 800 illustrated in FIG. 8 may be variously changed or modified without being limited thereto. For example, the point "a" of the first antenna element 810 may be connected to the point "a'" or the point "b" of the second antenna element 820, or may be connected to the point "b'" or the point "c'" of the third antenna element 830. The point "c" of the first antenna element 810 may be connected to the point "a'" and the point "b" of the second antenna element 820, or may be connected to the point "b'" or the point "e'" of the third antenna element 830. The point "a'" of the second antenna element 820 may be connected to the point "a" and the point "c" of the first antenna element 810, or may be connected to the point "b'" or the point "c'" of the third antenna element 830. The point "b of the second antenna element 820 may be connected to the point "a" and the point "c" of the first antenna element 810, or may be connected to the point "b'" or the point "c'" of the third antenna element 830.

Figure 9:
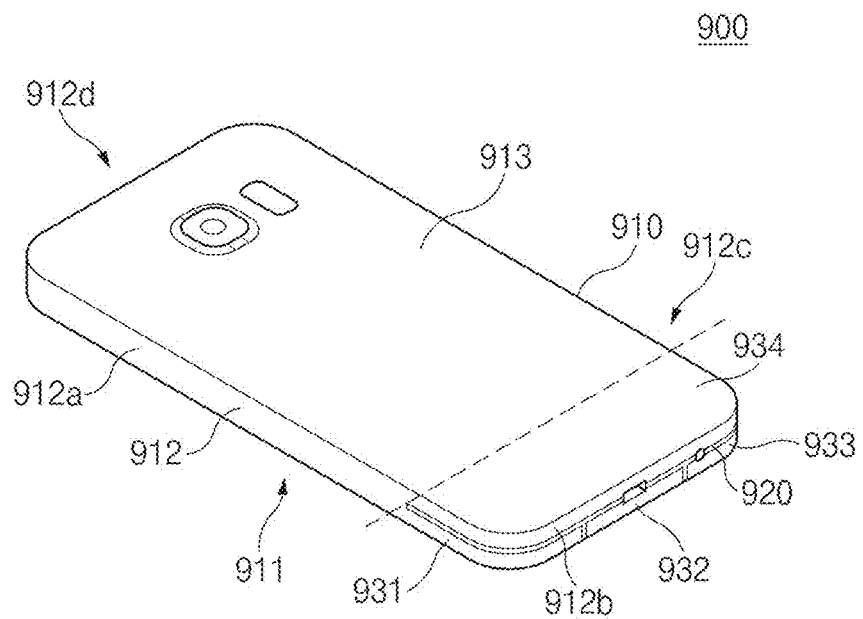
FIG. 9 illustrates an appearance of an electronic device according to an embodiment of the disclosure.
Figure 9:
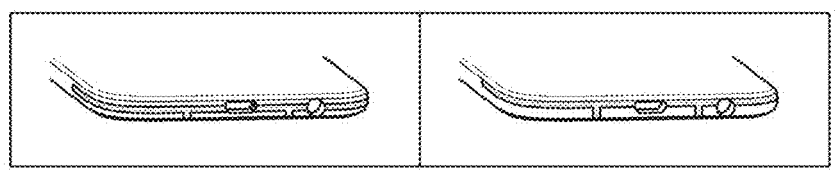
Figure 9:
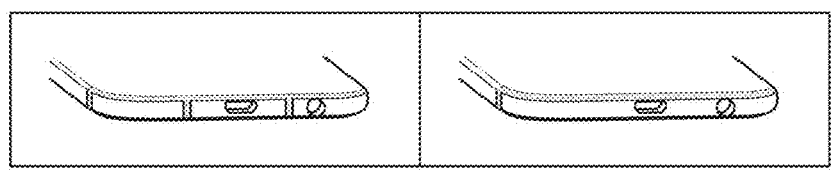

FIG. 9 illustrates an appearance of an electronic device according to an embodiment of the disclosure.

Referring to FIG. 9, an electronic device 900 (e.g., the electronic device 100 of FIG. 1 or the electronic device 100 of FIG. 2) may be surrounded by a housing 910. The housing 910 of the electronic device 900 may include a first plate 911 of the electronic device 900, a second plate 913 facing away from the first plate 911, a side member 912 surrounding a space between the first plate 911 and the second plate 913.

According to an embodiment of the disclosure, the housing 910, the first plate 911, the second plate 913, and the side member 912 may be the same as or similar to the housing 110, the first plate 111, the second plate 113, and the side member 112 of FIG. 1. Thus, additional description will be omitted to avoid redundancy.

According to an embodiment of the disclosure, the first plate 911 may include a touchscreen display exposed through at least a portion of the first plate 911. The first plate 911 may include a non-conductive region formed of a non-conductive material.

According to an embodiment of the disclosure, the side member 912 may include at least one slit 920 extending along a portion of at least one side in the form of pi ($\pi$). The slit 920 which is an elongated slit may be extend, for example, from a first point in a first side 912a to a second point in a third side 912c along a portion of the first side 912a, a second side 912b, and a portion of the third side 912c. The slit 920 may include a line which protrudes from a line extending from the first side 912a to the third side 912c. According to an embodiment of the disclosure, the protruding line may extend toward the first plate 911. The protruding line may be connected to the non-conductive region of the first plate 911, for example. The protruding line may include two lines protruding from the extending line. The first side 912a to a fourth side 912d may be the same as or similar to the first side 112a to the fourth side 112d described with reference to FIG. 1.

According to an embodiment of the disclosure, the slit 920 may include a non-conductive material. For example, the at least one slit 920 may be formed in a region in which a portion of an electrically conductive material of the housing 910 is removed.

According to an embodiment of the disclosure, the housing 910 may include a plurality of regions, at least some of which are separated by the slit 920. For example, the housing 910 may include a first region 931 to a fourth region 934 formed by the slit 920.

According to an embodiment of the disclosure, the first region 931 may include at least a portion of the side member 912. At least a portion of the first region 931 may be spaced from the fourth region 934, which includes at least a portion of the second plate 913, by the slit 920.

According to an embodiment of the disclosure, the second region 932 may include at least a portion of the side member 912, and may be physically spaced from the first region 931, the third region 933, and the fourth region 934 by the protruding line.

According to an embodiment of the disclosure, the third region 933 may include at least a portion of the side member 912. At least a portion of the third region 933 may be spaced from the fourth region 934, which includes at least a portion of the second plate 913, by the slit 920. According to an embodiment, a combination of one or more of the first region 931 to the fourth region 934 may operate as one antenna, or one of the first region 931 to the fourth region 934 may operate as a plurality of antennas.

Referring to FIG. 9, the pi-shaped slit 920 according to an embodiment may be variously positioned. According to an embodiment (TYPE A), the slit 920 which is an elongated slit may extend from the first side 912*a* to the third side 912*c*, and may be positioned to pass through an input/output interface of a lower end of the electronic device 900 upon extending. According to another embodiment (TYPE B), the slit 920 may be adjacent to the second plate 913, and the input/output interface may be formed at least a portion of the slit 920. According to another embodiment (TYPE C), the slit 920 may be positioned at a corner of the second plate 913, and may be interposed between the second plate 913 and the input/output interface. In this case, the protruding line of the slit 920 may be positioned at the second side 912*b*. According to another embodiment of the disclosure (TYPE D), the slit 920 may be positioned at a corner of the second plate 913, and the protruding line of the slit 920 may be positioned at the first side 912*a* and the third side 912*c*.

Figure 10:
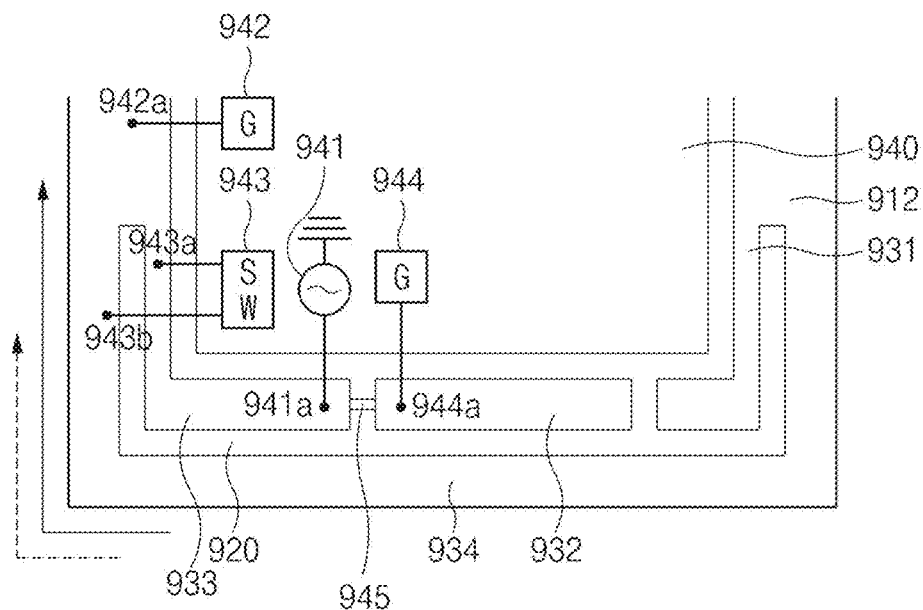
FIG. 10 illustrates an antenna structure of an electronic device according to an embodiment of the disclosure.

FIG. 10 illustrates an antenna structure of an electronic device according to an embodiment of the disclosure.

Referring to FIG. 10, an electronic device 1000 (e.g., the electronic device 900 of FIG. 9) may include a first region 931, a second region 932, a third region 933, or a fourth region 934. A housing (e.g., the housing 910 of FIG. 9) of the electronic device 1000 may include a board 940 in the housing. According to an embodiment, the electronic device 1000 of FIG. 10 may be the same as or similar to the electronic device 900 of FIG. 9, and the first region 931 to the fourth region 934 may be the same as or similar to the first region 931 to the fourth region 934 of FIG. 9.

According to an embodiment of the disclosure, the board 940 may be included inside the electronic device 1000. For example, the board 940 may include a printed circuit board (PCB). Various components of the electronic device 1000, such as a processor (e.g., the processor 1920 of FIG. 19), a memory (e.g., a memory 1930 of FIG. 19), and/or a communication circuit (e.g., a communication module 1990 of FIG. 19) may be positioned on the board 940. According to an embodiment, a ground plane may be formed on the board 940.

According to an embodiment of the disclosure, the communication circuit may transfer an electrical signal to the third region 933 through a feeding part 941. For example, the feeding part 941 may transfer an electrical signal to a feeding point 941*a* which is positioned in the third region 933 and is adjacent to the slit 920.

According to an embodiment of the disclosure, a ground part 942 may provide a ground to the third region 933 and may be electrically connected to the ground plane on the board 940. The ground part 942 may be coupled to a ground point 942*a* adjacent to one end of the slit 920.

According to an embodiment of the disclosure, a first electrical path which extends from the feeding point 941*a* coupled to the feeding part 941 to the ground point 942*a* coupled to the ground part 942 may be formed by the slit 920. The communication circuit may radiate a signal to an external space through the first electrical path.

According to an embodiment of the disclosure, the second region 932 and the third region 933 may be electrically connected. According to an embodiment, a connection part 945 may be interposed between the third region 933 and the second region 932. According to an embodiment, a first antenna (e.g., a first antenna 1110 of FIG. 11) may include the second region 932, the third region 933, the feeding point 941*a*, the ground point 942*a*, the fourth region 934, and/or the slit 920 interposed between the second region 932 and the third region 933. According to an embodiment of the disclosure, the first antenna may transmit or receive a signal in a low-frequency band.

According to an embodiment of the disclosure, the second region 932 and the third region 933 may not be connected. According to an embodiment of the disclosure, a second antenna (e.g., a second antenna 1120 of FIG. 11) including the second region 932 may include the feeding point 941*a*, the ground point 942*a*, the second region 932, and/or the slit 920 interposed between the second region 932 and the fourth region 934. In this case, the second antenna may transmit or receive a signal in a high-frequency band.

According to an embodiment of the disclosure, the connection part 945 may selectively connect the second region 932 and the third region 933 via feeding point 941*a* and point 944*a*. The connection part 945 may include, for example, a switch.

According to an embodiment of the disclosure, when viewed from above a first plate (e.g., the first plate 911 of FIG. 9) or a third plate (e.g., the third plate 913 of FIG. 9) of the electronic device 1000, switch connection points 943*a* and 943*b* for adjusting an electrical length of the slit 920 may be interposed between the feeding point 941*a* and the ground point 942*a*. The switch connection points 943*a* and 943*b* may be positioned in the third region 933 and the fourth region 934, for example.

According to an embodiment of the disclosure, a second electrical path extending from the feeding point 941*a* to the switch connection points 943*a* and 943*b* along the slit 920 may be formed. A communication circuit may radiate an electrical signal to an external space through the second electrical path. The second electrical path may have a length shorter than the first electrical path. For example, the electronic device 1000 may transmit or receive a signal of a high frequency by using the second electrical path.

According to an embodiment of the disclosure, the electronic device 1000 may include a switch 943 for adjusting an electrical path formed by the third region 933 and the slit 920. The switch 943 may be positioned on the board 940, for example. According to an embodiment, the switch 943 may be the same as or similar to the switch 330 of FIG. 3.

According to an embodiment of the disclosure, the switch 943 may be selectively connected to the switch connection points 943*a* and 943*b*. For example, the switch 943 may selectively connect the third region 933 and the fourth region 934. For example, the switch 943 may adjust an open/close of an electrical path formed between the third region 933 and the fourth region 934. The switch 943 may adjust connection between the switch connection points 943a and 943b positioned in the third and fourth regions 933 and 934. According to an embodiment, the switch 943 may be connected to a processor or the communication circuit. The processor or the communication circuit may control the open/close of the switch 943 depending on a target frequency. An electrically conductive member may be interposed between the third region 933 and the fourth region 934.

According to an embodiment of the disclosure, the connection of a feeding part (e.g., the feeding part 941) and a ground part (e.g., the ground part 942) may allow the first region 931 to the fourth region 934 to operate as an antenna element. In the following description, the first region 931 may be referenced as a first antenna element 931, the second region 932 may be referenced as a second antenna element 932, the third region 933 may be referenced as a third antenna element 933, and the fourth region 934 may be referenced as a fourth antenna element 934.

Figure 11:
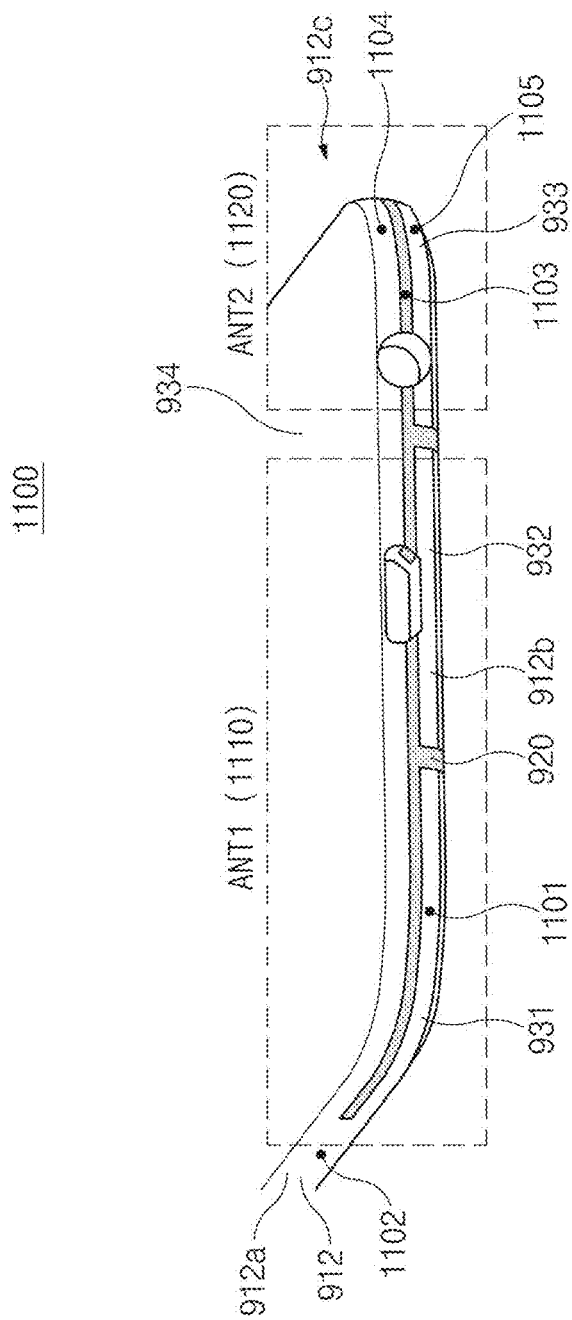
FIG. 11 is a view illustrating a configuration of a plurality of multi-band antennas formed by using a side slit structure of an electronic device according to various embodiments of the disclosure.

FIG. 11 is a view illustrating a configuration of a plurality of multi-band antennas formed by using a side slit structure of an electronic device according to various embodiments of the disclosure.

According to an embodiment of the disclosure, an electronic device 1100 (e.g., the electronic device 900 of FIG. 9 or the electronic device 100 of FIG. 2) may include a plurality of antennas so as to transmit or receive a signal in a multi-band.

Referring to FIG. 11, the electronic device 1000 may include the first antenna 1110 and the second antenna 1120.

The case where the first antenna 1110 and the second antenna 1120 are formed at a lower end of the electronic device 1100 is illustrated in FIG. 11. However, the disclosure is not limited thereto. For example, the first antenna 1110 and the second antenna 1120 may be formed at an upper end of the electronic device 1100.

The electronic device 1100 of FIG. 11 may be the same as or similar to the electronic device 900 of FIG. 9 or the electronic device 1000 of FIG. 10. For example, the first antenna element 931 to the fourth antenna element 934 of the electronic device 1100 may be the same as or similar to the first region 931 to the fourth region 934 of FIG. 9.

According to an embodiment of the disclosure, the first antenna 1110 may include the first antenna element 931 and the second antenna element 932 formed by the slit 920. The second antenna 1120 according to an embodiment may include the third antenna element 933 and/or the fourth antenna element 934 formed by the slit 920.

According to an embodiment of the disclosure, the first antenna 1110 may include the first antenna element 931 and the second antenna element 932. The first antenna element 931 and the second antenna element 932 may be internally connected. Referring to FIG. 11, the first antenna 1110 may include a first point 1101 coupled to a first feeding part and a second point 1102 coupled to a ground part. The first point 1101 may be positioned at the first antenna element 931. The first point 1101 may be adjacent to the slit 920. The second point 1102 according to an embodiment may be positioned at a first side 912a and may be adjacent to an end point of the slit 920. The first antenna 1110 may operate as an inverted F antenna (IFA).

According to an embodiment of the disclosure, the second antenna 1120 may include a third point 1103 coupled to a second feeding part. The third point 1103 according to an embodiment may be positioned adjacent to the slit 920.

According to an embodiment of the disclosure, an electrical length of the second antenna 1120 may be adjusted by a switch. The second antenna 1120 may include a fourth point 1104 and a fifth point 1105 coupled to the switch. The fourth point 1104 and the fifth point 1105 according to an embodiment may be interposed between the third point 1103 and a sixth point (not illustrated), when viewed from above the first plate 911 or the second plate 913 of the electronic device 1100. Depending on an operation of the switch (e.g., the switch 943 of FIG. 9), the third antenna element 933 and the fourth antenna element 934 may be electrically connected or may not be electrically connected. The fourth point 1104 and the fifth point 1105 may be the same as or similar to the switch connection points 943a and 943b of FIG. 10.

Although not illustrated in FIG. 11, the second antenna 1120 may further include the sixth point coupled to the ground part. The sixth point may be positioned adjacent to an end point to which the slit 920 extends along the third side 912c.

Figure 12:
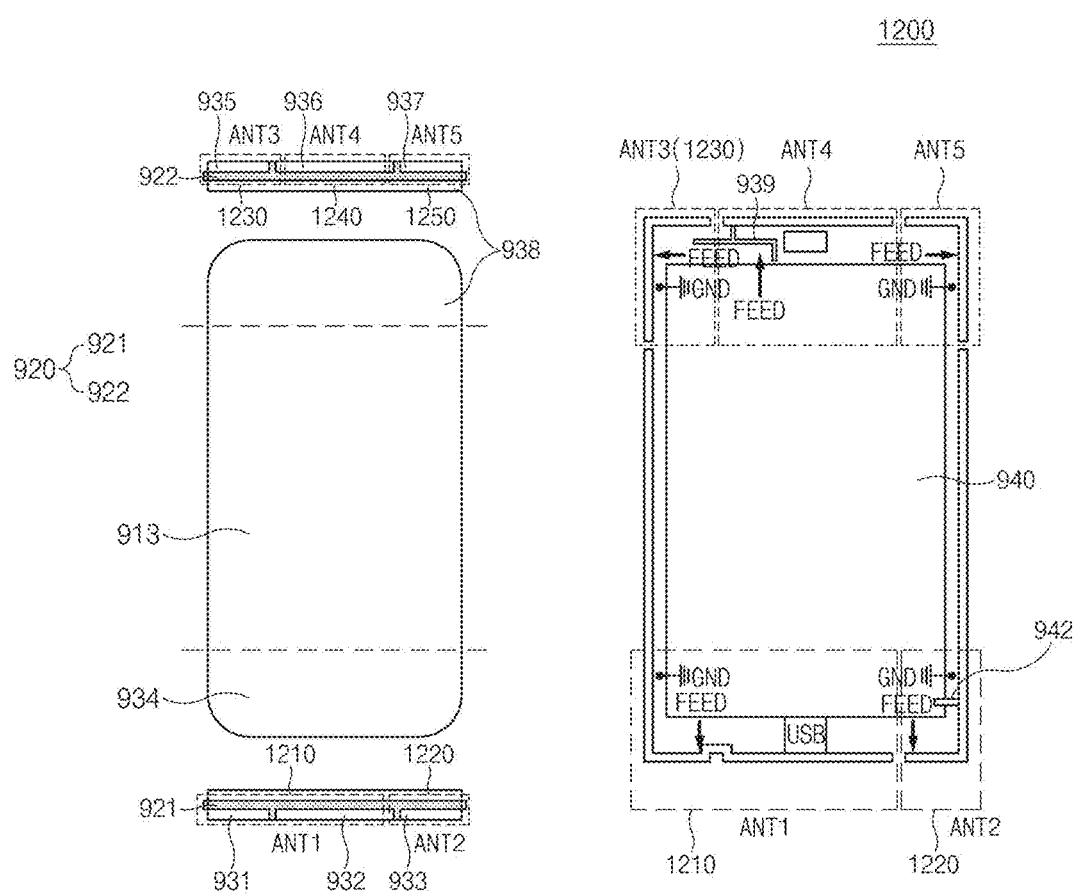
FIG. 12 is a view illustrating a configuration of a plurality of multi-band antennas formed by using a side slit structure of an electronic device according to various embodiments of the disclosure.

FIG. 12 is a view illustrating a configuration of a plurality of multi-band antennas formed by using a side slit structure of an electronic device according to various embodiments of the disclosure.

Referring to FIG. 12, an electronic device 1200 (e.g., the electronic device 900 of FIG. 9) may include a plurality of slits 920. For example, the electronic device 1200 may include a first slit 921 formed on a lower side and a second slit 922 formed on an upper side. According to an embodiment, the first slit 921 may be the same as or similar to the slit 920 of FIG. 11.

According to an embodiment of the disclosure, the electronic device 1200 may include a plurality of antennas formed by the plurality of slits 920. An electronic device according to an embodiment may transmit or receive a signal in a multi-band by using the plurality of antennas.

According to an embodiment of the disclosure, the electronic device 1200 may include a first antenna 1210 and a second antenna 1220 formed by the first slit 921. According to an embodiment, the first antenna 1210 and the second antenna 1220 may be the same as or similar to the first antenna 1110 and the second antenna 1120 of FIG. 11. Thus, additional description will be omitted to avoid redundancy.

According to an embodiment of the disclosure, the first antenna 1210 may transmit or receive a signal in a low band (e.g., 700 MHz to 1 GHz). According to an embodiment, the second antenna 1220 may transmit or receive a signal in a middle band (e.g., 1.6 GHz to 2.2 GHz) or a high band (e.g., 2.1 GHz to 3.7 GHz). For example, in the case where switch connection points (e.g., the fourth point 1104 and the fifth point 1105 of FIG. 11) of the second antenna 1220 are not electrically connected to each other, the second antenna 1220 may transmit or receive a signal in a relatively low band; in the case where the switch connection points are electrically connected to each other, the second antenna 1220 may transmit or receive a signal in a relatively high band.

According to an embodiment of the disclosure, by a switch 943, the switch connection points may be electrically connected or may not be connected. According to an embodiment, the switch 944 may be positioned on the board 940. The switch 944 may be, for example, the same as or similar to the switch 330 of FIG. 3.

According to an embodiment of the disclosure, in the case where the switch 944 is connected (or closed), an electrical length of the first slit 921 may be changed. For example, the electronic device 1200 may adjust a resonant frequency of the second antenna 1220 by adjusting the open/close of the switch 944.

The case where the switch 944 is connected to the second antenna 1220 is illustrated in FIG. 12. However, the disclosure is not limited thereto. For example, an antenna switching structure according to various embodiments of the disclosure may be variously changed or modified. For example, the switch 944 may be connected to the first antenna 1210.

Referring to FIG. 12, the electronic device 1200 may further include the second slit 922 on an upper side of the electronic device 1200. The second slit 922 may be the same as or similar to the slit 920 of FIG. 9. Thus, additional description will be omitted to avoid redundancy.

According to an embodiment of the disclosure, the electronic device 1200 may include a fifth region 935, a sixth region 936, a seventh region 937, and an eighth region 938 formed by the second slit 922.

According to an embodiment of the disclosure, at least a portion of the fifth region 935 may be formed at a side member (e.g., the side member 912 of FIG. 9), and the fifth region 935 may be physically spaced from the sixth region 936 by the second slit 922. At least a portion of the fifth region 935 may be spaced from the eighth region 938.

According to an embodiment of the disclosure, at least a portion of the sixth region 936 may be formed at the side member, and the sixth region 936 may be physically spaced from the fifth region 935, the seventh region 937, and the eighth region 938 by the second slit 922.

According to an embodiment of the disclosure, the seventh region 937 may be at least partially formed at the side member, may be physically spaced from the sixth region 936 by the second slit 922, and may include at least partially and physically spaced from the eighth region 938.

According to an embodiment of the disclosure, the eighth region 938 may be at least partially and physically spaced from the fifth region 935 to the seventh region 937, and may include at least a portion of the second plate 913. According to an embodiment, the eighth region 938 may include a portion of the side member depending on the arrangement of the second slit 922.

According to various embodiments of the disclosure, the fifth region 935, the sixth region 936, the seventh region 937, or the eighth region 938 may operate as an antenna element. In the following description, the fifth region 935 may be referenced as a fifth antenna element 935, the sixth region 936 may be referenced as a sixth antenna element 936, and the seventh region 937 may be referenced as a seventh antenna element 937.

According to an embodiment of the disclosure, the plurality of antenna elements may operate as a plurality of antennas which transmit or receive signals in different frequency bands. According to an embodiment, the fifth antenna element 935 may operate as a third antenna transmitting or receiving a wireless fidelity (Wi-Fi) signal. The third antenna 1230 may operate through connection with a feeding part and a ground part.

According to an embodiment of the disclosure, the sixth antenna element 936 may transmit or receive a signal in a high band (or a high-frequency signal), a signal in a low band (or a low-frequency signal), and/or a global positioning system (GPS) signal. According to an embodiment, the sixth antenna element 936 may be electrically connected to a radiator 939. The radiator 939 may include a PCB pattern printed on a printed circuit board or a conductive pattern formed along at least an inner side of a housing (e.g., the housing 910 of FIG. 9). According to an embodiment of the disclosure, the feeding part may transfer an electrical signal to the radiator 939 or may transfer an electrical signal to the sixth antenna element 936.

According to an embodiment of the disclosure, the seventh antenna element 937 may transmit or receive a GPS signal. The communication circuit may transfer an electrical signal to the seventh antenna element 937 through the feeding part.

According to an embodiment of the disclosure, the board 940 may include the feeding part for transferring an electrical signal to the first antenna element 931 to the seventh antenna element 937, and/or the ground part providing a ground. According to an embodiment, the feeding part may be electrically connected to the communication circuit and may be positioned on the board 940. The ground part may be connected to a ground plane formed on the board 940.

Figure 13:
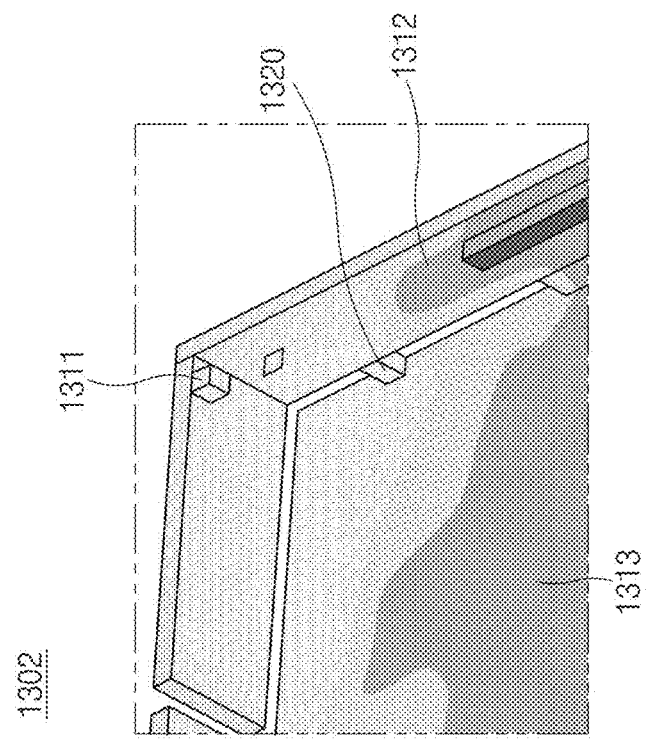
FIG. 13 is a view illustrating a current distribution of a rear housing of an electronic device according to an embodiment of the disclosure.
Figure 13:
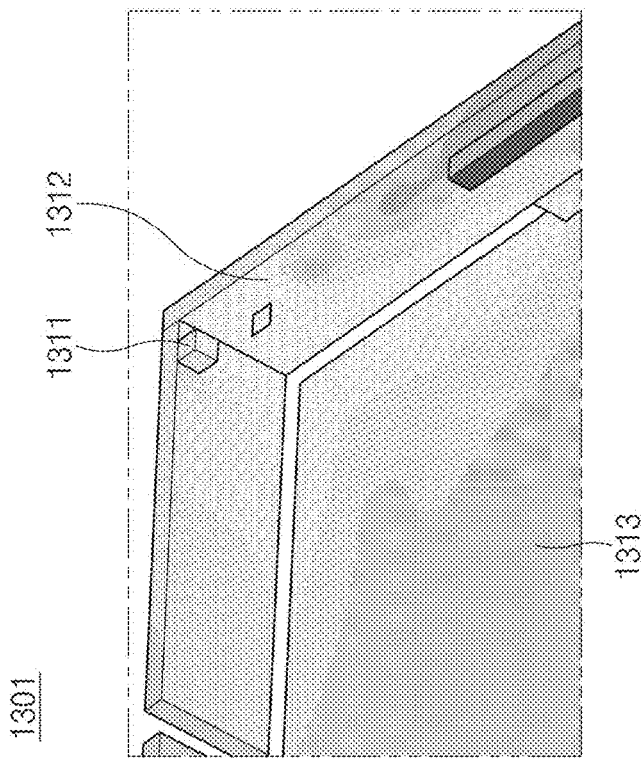

FIG. 13 is a view illustrating a current distribution of a rear housing of an electronic device according to an embodiment of the disclosure.

FIG. 13 shows a current distribution of a rear housing in the case where a partial region of a side member (hereinafter referred to as a "side housing") of an electronic device (e.g., the electronic device 100 of FIG. 1, the electronic device 100 of FIG. 2, the electronic device 700 of FIG. 7, or the electronic device 900 of FIG. 9) operates as a first antenna element and a partial region of a second plate (hereinafter referred to as a "rear housing") of the electronic device operates as a second antenna element.

According to an embodiment of the disclosure, a first current distribution 1301 shows a current distribution of a rear housing 1313 in the case where a side housing 1312 is connected to a feeding part 1311 and the rear housing 1313 (e.g., the second plate 113 of FIG. 1, the second plate 713 of FIG. 7, or the second plate 913 of FIG. 9) is not connected to the rear housing 1312.

According to an embodiment of the disclosure, a second current distribution 1302 shows a current distribution of the rear housing 1313 in the case where the side housing 1312 is connected to the feeding part 1311 and the rear housing 1313 and the rear housing 1312 are electrically connected via element 1320. According to an embodiment, the side housing 1312 may be connected to the feeding part 1311.

In FIG. 13, a relatively bright portion indicates a high current density, and a relatively dark portion indicates a low current density.

The first current distribution 1301 shows that a current density of a surface of the rear housing 1313 is low compared with the second current distribution 1302. Referring to the first current distribution 1301, in the case where a primary antenna element formed at the side housing 1312 is connected to only a ground part on a printed circuit board, the radiation efficiency of the side housing 1312 may decrease due to influence of the rear housing 1313.

The second current distribution 1302 shows that a current density of the rear housing 1313 is high compared with the first current distribution 1301. According to an embodiment, the rear housing 1313 may operate as a portion of an antenna element when a current is induced at the rear housing 1313 of the electronic device. According to an embodiment, an electrical length of an antenna, which is determined by a slit, may be adjusted by shorting the side housing 1312 being the primary antenna element to the rear housing 1313.

It may be understood from FIG. 13 that the current distribution of the rear housing 1313 corresponding to the second current distribution 1302 is higher than the current distribution of the rear housing 1313 corresponding to the first current distribution 1301. The magnitude and area of the distribution of the current induced at the rear housing 1313 may increase by connecting the side housing 1312 to the rear housing 1313, and thus, the rear housing 1313 may operate as a portion of an antenna element.

Figure 14:
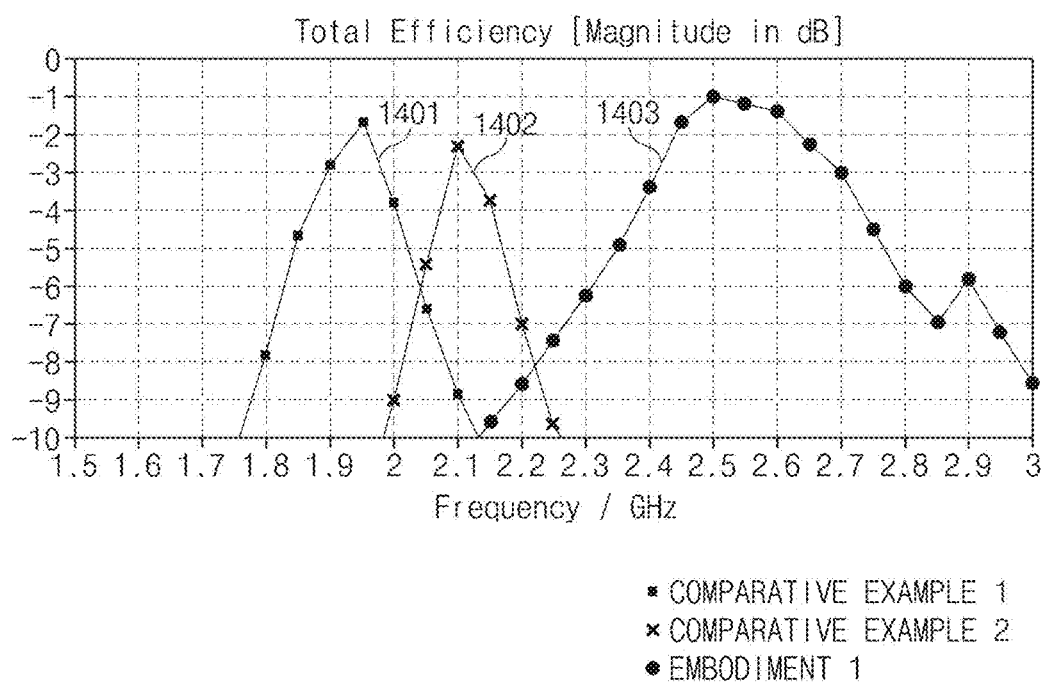
FIG. 14 is a view for describing antenna efficiency of an electronic device according to an embodiment of the disclosure.

FIG. 14 is a view for describing antenna efficiency of an electronic device according to an embodiment.

FIG. 14 shows the efficiency of an antenna included in an electronic device (e.g., the electronic device 100 of FIG. 1, the electronic device 100 of FIG. 2, the electronic device 700 of FIG. 7, or the electronic device 900 of FIG. 9) according to an embodiment. According to comparative example 1, a side housing of an electronic device may be connected to a ground part on a printed circuit board through one point. According to comparative example 2, the side housing of the electronic device may be connected to the ground part on the printed circuit board through one point (hereinafter referred to as a "first point") and another point (hereinafter referred to as a "second point"). For example, to block an electrical length of a slit, the second point may be interposed between one point, to which an electrical signal is transferred, and the first point coupled to the ground part. A side housing of an electronic device according to an embodiment may be connected to a rear housing.

Referring to FIG. 14, a first graph 1401 shows radiation efficiency measured depending on an antenna frequency of an electronic device according to comparative example 1. An antenna of the electronic device according to comparative example 1 may resonate at about 1.95 GHz. The total radiation efficiency when the antenna of the electronic device according to comparative example 1 resonates at 1.95 GHz may be about −1.7 dB.

A second graph 1402 shows radiation efficiency measured depending on an antenna frequency of an electronic device according to comparative example 2. An antenna of the electronic device according to comparative example 2 may resonate at about 2.1 GHz. The total radiation efficiency when the antenna of the electronic device according to comparative example 2 resonates at 2.1 GHz may be about −2.1 dB.

A third graph 1403 shows radiation efficiency measured depending on an antenna frequency of an electronic device according to an embodiment of the disclosure. An antenna of the electronic device according to embodiment 1 may resonate at about 2.5 GHz. The total radiation efficiency when the antenna of the electronic device according to embodiment 1 resonates at 2.5 GHz may be about −1 dB.

Referring to the second graph 1402 and the third graph 1403, a current induced at a side housing according to an embodiment of the disclosure may be distributed at the whole antenna element, and thus, the peak of the radiation efficiency and a bandwidth may increase. According to an embodiment, an end of a slit which determines an electrical length of an antenna determined may be effectively blocked by connecting a side housing and a rear housing.

A difference in resonant frequencies of comparative example 1 and embodiment 1 may be greater than a difference in resonant frequencies of comparative example 1 and comparative example 2. For example, the electronic device may switch resonant frequencies with a large width by selectively connecting the side housing and the rear housing.

Figure 15:
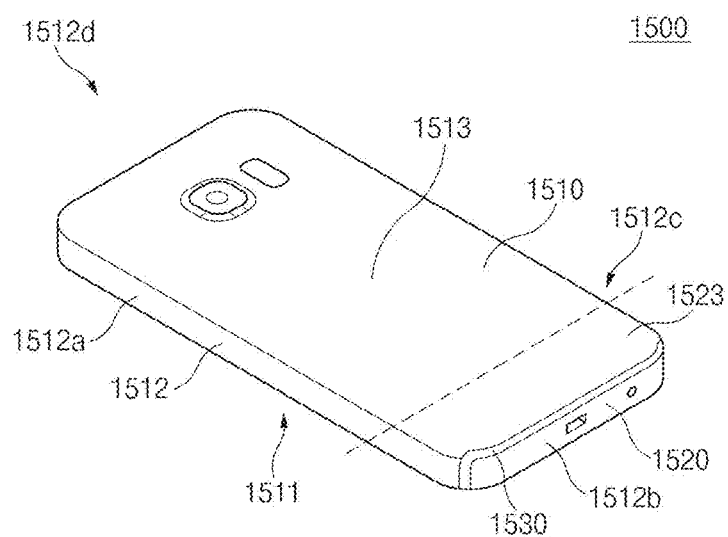
FIG. 15 is a perspective view of an electronic device according to an embodiment of the disclosure.
Figure 15:
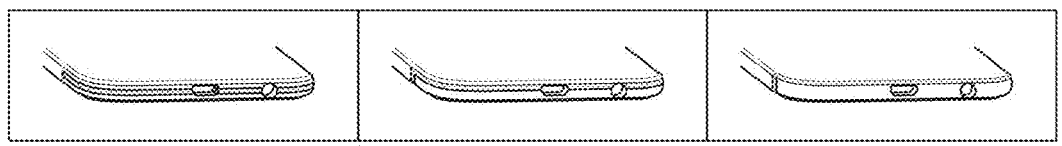

FIG. 15 is a perspective view of an electronic device according to an embodiment of the disclosure.

Referring to FIG. 15, an electronic device 1500 (e.g., the electronic device 100 of FIG. 1, the electronic device 100 of FIG. 2, or the electronic device 700 of FIG. 7) according to an embodiment may include a metal housing 1510, a conductive member 1520, and a slit 1530.

According to an embodiment, the metal housing 1510 may be positioned to cover at least a second plate 1513 (e.g., a rear surface) of the electronic device 1500. The metal housing 1510 may cover at least a portion of a side member 1512 of the electronic device 1500. A touchscreen display may be exposed through a partial region of a first plate 1511 facing away from the second plate 1512 where the metal housing 1510 is positioned. According to an embodiment of the disclosure, the first plate 1511 may include a non-conductive region.

According to an embodiment of the disclosure, the metal housing 1510 may include the slot 1530. For example, one or more slits 1530 may be formed between the side member 1512 and the second plate 1513 of the metal housing 1510. The slit 1530 formed at the metal housing 1510 may be filled with a non-conductive material.

According to an embodiment of the disclosure, the side member 1512 may include the conductive member 1520. For example, the conductive member 1520 may be a portion of a metal housing or a metal frame surrounding a side surface of the electronic device 1500. The conductive member 1520 may be physically spaced from a first region 1523 of the metal housing 1510, for example, by the slit 1530.

According to an embodiment of the disclosure, the slit 1530 may be interposed between the conductive member 1520 and the first region 1523 of the metal housing 1510. The slit 1530 may be formed in a "C" shape. For example, the slit 1530 may be positioned to extend from a first side 1512a to a third side 1512c surrounding the side surface of the electronic device 1500. The slit 1530 may extend to pass through a second side 1512b between the first side 1512a and the third side 1512c.

According to an embodiment of the disclosure, the slit 1530 may be provided in a closed shape where an end point(s) is connected to the non-conductive region. For example, the slit 1530 may be provided in a shape where the end point is curved toward the first plate 1511 of a housing. According to an embodiment of the disclosure, the slit 1530 may be filled with a non-conductive material.

According to an embodiment of the disclosure, if an electrical signal is supplied to the conductive member 1520, the metal housing 1510 may act as a factor to reduce the radiation performance of an antenna including the conductive member 1520. To reduce a decrease in the radiation performance of the antenna, the conductive member 1520 may be electrically connected to the metal housing 1510.

The metal housing 1510 and the conductive member 1520 may be selectively connected according to various embodiments of the disclosure. For example, the metal housing 1510 may correspond to the first antenna element 310 of FIG. 3, and the conductive member 1520 may be the same as or similar to the second antenna element 320. In this case, the metal housing 1510 and the conductive member 1520 may be selectively connected like the first antenna element 310 and the second antenna element 320.

Referring to FIG. 15, the C-shaped slit 1530 according to an embodiment may be variously positioned. According to an embodiment (TYPE A), the slit 1530 which is an elongated slit may extend from the first side 1512a to the third side 1512c, and may be formed to pass through an input/output interface of a lower end of the electronic device 1500 upon extending. In this case, a portion of the slit 1530 may be cut by the input/output interface.

According to another embodiment of the disclosure (TYPE B), the C-shaped slit 1530 may be interposed between the input/output interface and the second plate 1513 of the metal housing 1510.

According to another embodiment of the disclosure (TYPE C), the slit 1530 may be positioned adjacent to the second plate 1513 or may be positioned at least a portion of the second plate 1513. In this case, one of antenna elements specified by the slit 1530 may not include the side member 1512.

Figure 16:
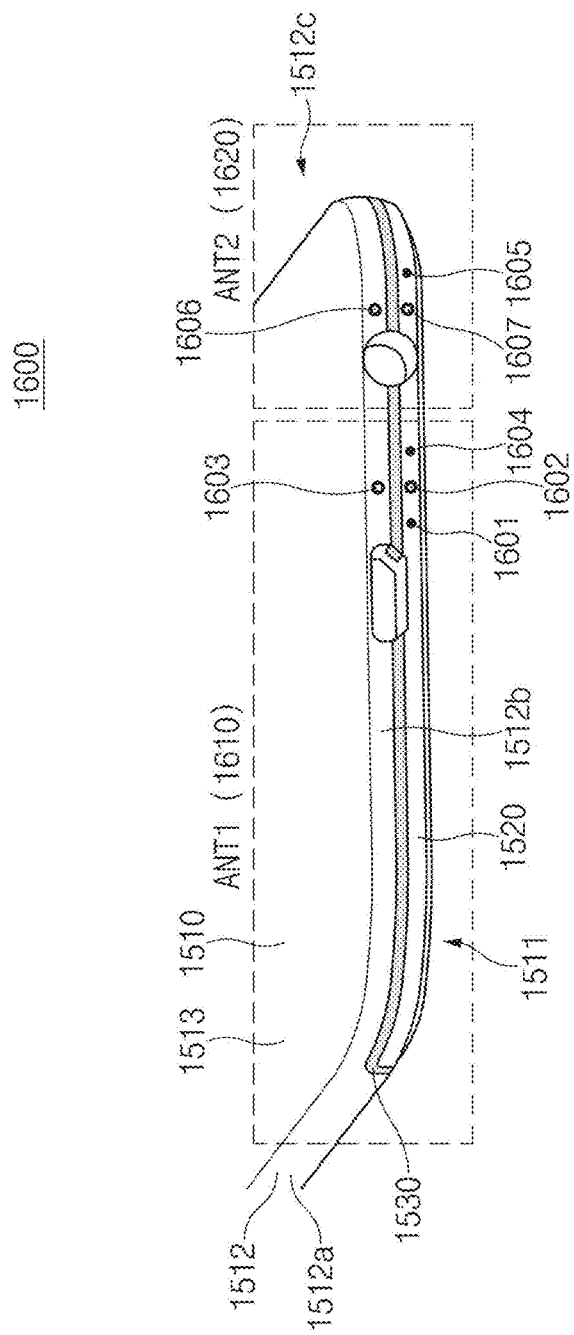
FIG. 16 is a view illustrating a configuration of a plurality of multi-band antennas formed by using a side slit structure of an electronic device according to various embodiments of the disclosure.

FIG. 16 is a view illustrating a configuration of a plurality of multi-band antennas formed by using a side slit structure of an electronic device according to various embodiments of the disclosure.

Referring to FIG. 16, an electronic device 1600 (e.g., the electronic device 1500 of FIG. 15) may include a conductive member 1520 physically spaced from a metal housing 1510 by a slit 1530, and may further include a plurality of antennas formed at least at the conductive member 1520. According to an embodiment, the electronic apparatus 1600 may be substantially the same as the electronic device 1500 of FIG. 15. For example, the metal housing 1510 of FIG. 16 may be the same as or similar to the metal housing 1510 of FIG. 15.

According to an embodiment of the disclosure, the plurality of antennas may include, for example, a first antenna 1610 and a second antenna 1620. According to an embodiment, the first antenna 1610 and the second antenna 1620 may support signals in different frequency bands.

According to an embodiment of the disclosure, the first antenna 1610 and the second antenna 1620 may be distinguished from each other by the slit 1530, a ground point, and a feeding point. Depending on locations of the ground point and the feeding point, a partial region of the conductive member 1520 may operate as the first antenna 1610, and the remaining region of the conductive member 1520 may operate as the second antenna 1620.

According to an embodiment of the disclosure, a communication circuit may transfer an electrical signal to a first point 1601 adjacent to the slit 1530. A fourth point 1604 of the conductive member 1520 may be selectively coupled to a ground plane. An electrical path which extends from one end point of the slit 1530 to the fourth point 1604 may be formed at the conductive member 1520. The electronic device 1600 may transmit or receive a signal of a target frequency through the electrical path. For example, the electrical path may perform a role of the first antenna 1610.

According to an embodiment of the disclosure, when viewed from above the first plate 1511 (e.g., a front surface) or the second plate 1513 (e.g., a rear surface) of the electronic device 1600, a second point 1602 and a third point 1603 which are formed to adjust a length of an electrical path may be interposed between the first point 1601 and the fourth point 1604. The second point 1602 and the third point 1603 may be respectively positioned at the conductive member 1530 and the metal housing 1510 (or the first region 1523 of FIG. 15).

According to an embodiment of the disclosure, a switch may connect the second point 1602 and the third point 1603 such that an electrical path of the slit 1530 forming the first antenna 1610 may be adjusted and a resonant frequency of the first antenna 1610 may be selected.

According to an embodiment of the disclosure, the second antenna 1620 may include at least a portion of the conductive member 1520 and/or the metal housing 1510 (or the first region 1523 of FIG. 15). According to an embodiment, the communication circuit may transfer an electrical signal to a fifth point 1605 of the conductive member 1520 through the feeding part. According to an embodiment, the fourth point 1604 may be interposed between the first point 1601 of the first antenna 1610 and the fifth point 1605.

According to an embodiment, the second antenna 1620 may be connected to the ground plane through the fourth point 1604. The first antenna 1610 and the second antenna 1620 may share the fourth point 1604 coupled to the ground part.

According to an embodiment of the disclosure, the second antenna 1620 may include an electrical path formed by the fourth point 1604 and a slit 1530, which extends from the third side 1512*c* of the side member 1512 to the second side 1512*b*. If an electrical signal is supplied to the fifth point 1605, a wireless communication circuit may radiate a signal to an external space through the electrical path.

According to an embodiment of the disclosure, a sixth point 1606 and a seventh point 1607 for adjusting a length of an electrical path formed by the slit 1530 may be interposed between the fourth point 1604 and the fifth point 1605. The sixth point 1606 and the seventh point 1607 may be coupled to a switch for adjusting a resonant frequency of the second antenna 1620. Depending on an operation of the switch, the sixth point 1606 and the seventh point 1607 may be electrically coupled or may not be electrically coupled.

According to an embodiment of the disclosure, if the sixth point 1606 and the seventh point 1607 are electrically coupled, the electrical path of the second antenna 1620 formed by the slit 1530 may become shorter. When the sixth point 1606 and the seventh point 1607 are coupled, the second antenna 1620 may transmit or receive a signal of a higher frequency than when the sixth point 1606 and the seventh point 1607 are not coupled.

Figure 17:
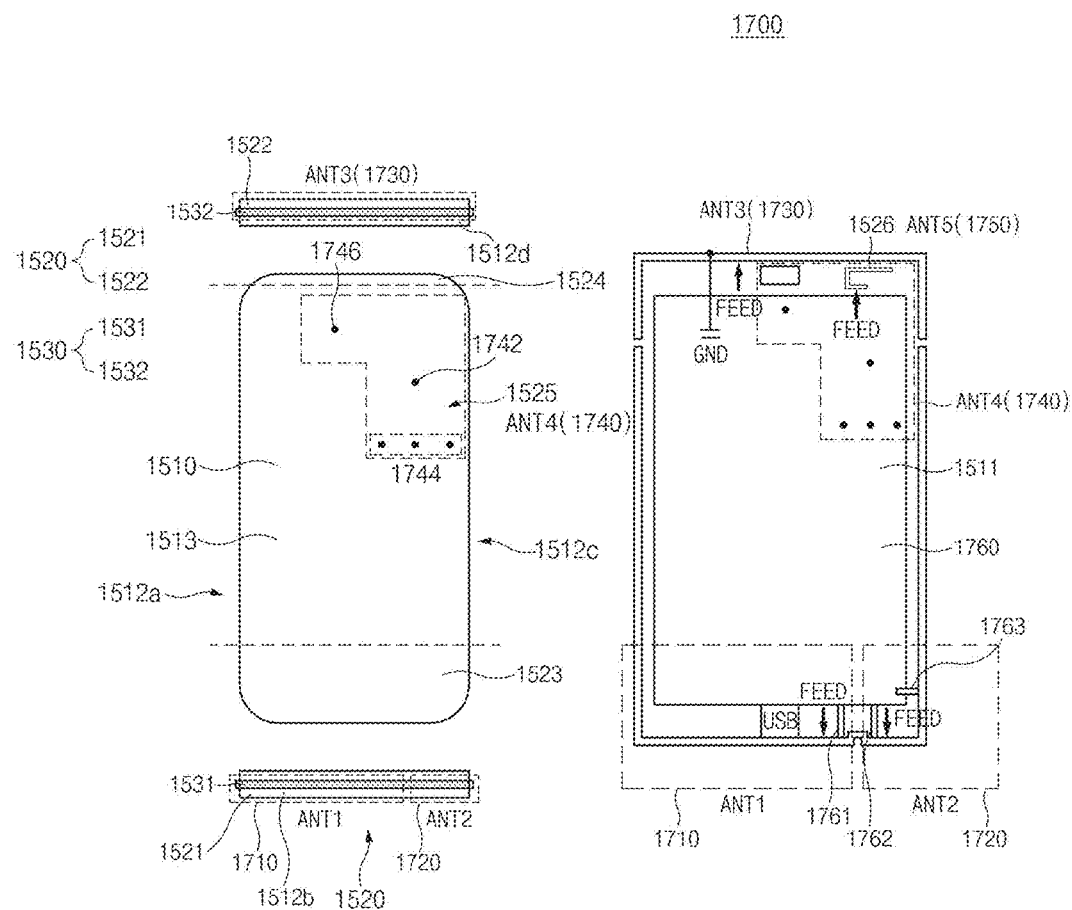
FIG. 17 is a view illustrating a configuration of a plurality of multi-band antennas formed by using a side slit structure of an electronic device according to various embodiments of the disclosure.

FIG. 17 is a view illustrating a configuration of a plurality of multi-band antennas formed by using a side slit structure of an electronic device according to various embodiments of the disclosure.

Referring to FIG. 17, an electronic device 1700 (e.g., the electronic device 1500 of FIG. 15) may include a plurality of multi-band antennas formed by using a plurality of slits 1530, for example, a first slit 1531 and a second slit 1532. The electronic device 1700 may include a configuration that is the same as or similar to the configuration of the electronic device 1500 of FIG. 15.

According to an embodiment of the disclosure, the electronic device 1700 may include a side member 1512 including the first side 1512*a* to the fourth side 1512*d*. The second side 1512*b* and the fourth side 1512*d* may extend in parallel, and a length of the second and fourth sides 1512*b* and 1512*d* may be shorter than a length of the first and third sides 1512*a* and 1512*c*. The second side 1512*b* and the fourth side 1512*d* may be perpendicular to the first side 1512*a* and the third side 1512*c*.

According to an embodiment of the disclosure, at least a portion of the second side 1512*b* and the fourth side 1512*d* may include the conductive member 1520. The conductive member 1520 may include a first conductive member 1521 positioned at least at the second side 1512*b* and a second conductive member 1522 positioned at least at the fourth side 1512*d*.

According to an embodiment of the disclosure, the electronic device 1700 may include the first slit 1531 extending from the first side 1512*a* to the third side 1512*c* through the second side 1512*b*, and the second slit 1532 extending from the first side 1512*a* to the third side 1512*c* through the fourth side 1512*d*. According to an embodiment, the second slit 1532 may be provided in the form of "C" like the first slit 1531.

According to an embodiment of the disclosure, the first conductive member 1521 may be physically spaced from the metal housing 1510 or the first region 1523 of the metal housing 1510 by the first slit 1531. According to an embodiment, the second conductive member 1522 may be physically spaced from the metal housing 1510 or a second region 1524 of the metal housing 1510 by the second slit 1532.

According to an embodiment of the disclosure, the first region 1523 may include a portion of a second plate 1713 and/or a side member 1712 of the electronic device 1700. The second region 1524 may include a portion of the second plate 1713 and/or the side member 1712 of the electronic device 1700.

According to an embodiment of the disclosure, the electronic device 1700 may include a plurality of antennas which transmit or receive signals in a multi-band. The electronic device 1700 may include a first antenna 1710, a second antenna 1720, or a third antenna 1730 by at least using the first slit 1731 and the second slit 1732.

According to an embodiment of the disclosure, the electronic device 1700 may include the first antenna 1710 and the second antenna 1720 each including a portion of the first conductive member 1521. The first antenna 1710 of FIG. 17 may be the same as or similar to the first antenna 1610 of FIG. 16. Thus, additional description will be omitted to avoid redundancy.

According to an embodiment of the disclosure, the first antenna 1710 may support a low-frequency band. The first antenna 1710 may support signals of different frequencies in the low-frequency band depending on an operation of a first switch 1761. According to an embodiment, the first switch 1761 may be a switch which adjusts an open/close of an electrical path of the second point 1602 and the third point 1603 of FIG. 16.

According to an embodiment of the disclosure, the second antenna 1720 may support a middle-frequency band and a high-frequency band. Depending on a switch operation, the second antenna 1720 may transmit or receive a signal of a middle frequency or may transmit or receive a signal of a high frequency.

According to an embodiment of the disclosure, the electronic device 1700 may include at least one switch for the purpose of adjusting a frequency of the second antenna 1720. The at least one switch may include a second switch 1762 and a third switch 1763.

Depending on a target frequency, the electronic device 1700 may close the second switch 1762 or may close the third switch 1763. For example, a length of an electrical path of the second antenna 1720 when the second switch 1762 is closed may be shorter than a length of an electrical path of the second antenna 1720 when the third switch 1763 is closed. A frequency band in which the second antenna 1720 resonates when the second switch 1762 is closed may be higher than a frequency band in which the second antenna 1720 resonates when the third switch 1763 is closed. According to an embodiment, the second switch 1762 or the third switch 1763 may control connection of the first conductive member 1521 and the metal housing 1510 (or the first region 1523 of the metal housing 1510). According to an embodiment, a processor may adjust a frequency of the second antenna 1720 by adjusting the open/close of the second switch 1762 or the third switch 1763.

According to an embodiment of the disclosure, the electronic device 1700 may include the third antenna 1730 including at least a portion of the second conductive member 1522. According to an embodiment of the disclosure, if an electrical signal is supplied to the second conductive member 1522, at least a portion of the second conductive member 1522 may operate as the third antenna 1730. For example, the third antenna 1730 may transmit or receive a signal in a low-frequency band, a signal in a high-frequency band, and/or a GPS signal.

According to an embodiment of the disclosure, the third antenna 1730 of the electronic device 1700 may be electrically connected to a feeding part and a ground part on a board 1760. The feeding part and the ground part may be coupled to a point adjacent to the second slit 1532.

According to an embodiment of the disclosure, in addition to the antennas formed by the plurality of slits 1530, the electronic device 1700 may include a plurality of antennas using the metal housing 1710 or the like for the purpose of transmitting or receiving signals in various frequency bands.

According to an embodiment of the disclosure, a third region 1513 including at least a portion of the second plate 1513 may operate as a fourth antenna 1740. If a wireless communication circuit supplies an electrical signal to the third region 1525, the fourth antenna 1740 may be formed at the third region 1525.

According to an embodiment of the disclosure, the fourth antenna 1740 including at least the third region 1525 may transmit or receive signals of various frequencies by changing a feeding point to transfer an electrical signal to the third region 1525 or a ground point to provide a ground.

According to an embodiment of the disclosure, some points in the third region 1525 of the electronic device 1700 may be electrically coupled to the board 1760 in the electronic device 1700. For example, a seventh point 1742 may be electrically coupled to the wireless communication circuit, and a plurality of eighth points 1744 and a ninth point 1746 may be electrically coupled to the ground plane. According to an embodiment, a resonant frequency of the fourth antenna 1740 may vary with a distance between the seventh point 1742 and the plurality of eighth points 1744.

According to an embodiment of the disclosure, the wireless communication circuit may feed the seventh point 1742 in the third region 1525. The seventh point 1742 may be coupled to the third region 1525, for example, through a C-clip. The third region 1525 may be fed in a direct feeding manner or in an indirect feeding manner.

In an embodiment of the disclosure, the ground plane may be electrically coupled to the plurality of eighth points 1744 positioned in a first feeding region belonging to the third region 1525, and the ninth point 1746 positioned in a second feeding region belonging to the third region 1525.

In an embodiment of the disclosure, the seventh point 1742 may be closer to a specific side of sides than the plurality of eighth points 1744. For example, the seventh point 1742 may be interposed between the specific side and the plurality of eighth points 1774. The ninth point 1746 may be closer to the specific side than the seventh point 1742 and the plurality of eighth points 1744. According to an embodiment, the specific side may be the fourth side 1512*d*.

According to an embodiment of the disclosure, if an electrical signal is provided to the seventh point 1742 in the third region 1525, a partial region of the third region 1525 may operate as the fourth antenna 1740. For example, a partial region specified by locations of the seventh point 1742 and the ninth point 1746 may operate as the fourth antenna 1740. For example, the third point 1525 and a display exposed through the first plate 1511 facing away from the second plate 1513 of the electronic device 1700 may operate as a planar inverted F antenna (PIFA).

In an embodiment of the disclosure, a space of a given width may be present between the first plate 1511 and the second plate 1513 of the electronic device 1700. For example, the space of the given width may be a slot or a black matrix (BM). An electrical signal may be radiated through the space. According to an embodiment of the disclosure, the fourth antenna 1740 may transmit or receive a signal in a middle band.

According to an embodiment of the disclosure, the electronic device 1700 may further include a fifth antenna 1750 formed at the first plate 1511. According to an embodiment, the first plate 1511 of the electronic device 1700 may further include a radiator 1526 at any other region except for the display. The radiator 1526 may be formed along an inner side of the first plate 1511.

According to an embodiment of the disclosure, if an electrical signal is transferred to the radiator 1526, the radiator 1526 may operate as the fifth antenna 1750. The fifth antenna 1750 may transmit or receive a signal in a different frequency domain from the first antenna 1710, the second antenna 1720, the third antenna 1730, or the fourth antenna 1740 or a signal of a different type from the first antenna 1710, the second antenna 1720, the third antenna 1730, or the fourth antenna 1740. The fifth antenna 1750 may transmit or receive, for example, a GPS signal.

Figure 18:
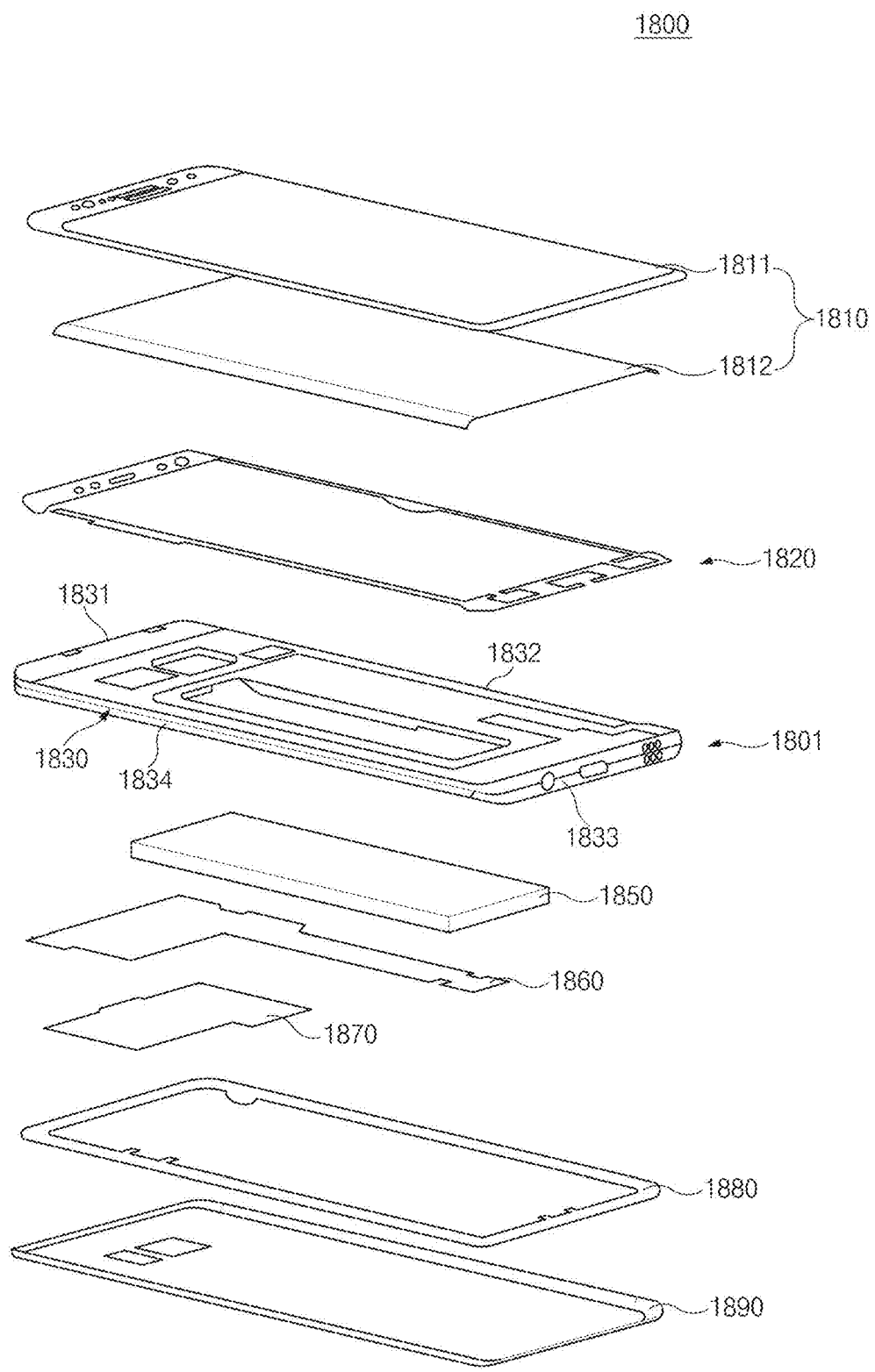
FIG. 18 is an exploded perspective view of an electronic device according to an embodiment of the disclosure.

FIG. 18 is an exploded perspective view of an electronic device according to an embodiment.

Referring to FIG. 18, an electronic device 1800 may include a first plate 1811, a second plate 1890 facing away from the first plate 1811 and spaced from the first plate 1811, a first support member 1801 including a side member 1830 surrounding a space between the first plate 1811 and the second plate 1890.

According to an embodiment of the disclosure, the side member 1830 may include a first side 1831 extending in a first direction (e.g., +x or −x) and having a first length, a second side 1832 extending in a second direction (e.g., +y or −y) perpendicular to the first direction and having a second length longer than the first length, a third side 1833 extending in parallel to the first side 1831 and having the first length, and a fourth side 1834 extending in parallel to the second side 1832 and having the second length.

According to various embodiments of the disclosure, the electronic device 1800 may include at least one first seal member 1820, and a touchscreen display 1810 including the first plate 1811 (e.g., a front glass or a glass plate) and a touch display module 1812 attached on a back surface of the first plate 1811.

According to an embodiment of the disclosure, the electronic device 1800 may include a PCB 1860, a battery 1850, a second support member 1870, a second seal member 1880, and the second plate 1890 (e.g., a rear window or a rear metal cover).

Although not illustrated in FIG. 18, the electronic device 1800 may further include a wireless power receiving member. According to an embodiment, the electronic device 1800 may further include a detection member for detecting an electronic pen used as a data input means. According to an embodiment, the detection member may include an electromagnetic resonance (EMR) sensor pad operating in a magnetic induction manner, for the purpose of receiving a feedback signal by a resonant frequency of a coil structure provided in the electronic pen.

According to various embodiments of the disclosure, the battery 1850 may be accommodated in a space defined in the first support member 1801, and may be positioned to avoid the PCB 1860 or to overlap at least partially with the PCB 1860. According to an embodiment, the battery 1850 and the PCB 1860 may be positioned in parallel without overlapping each other.

According to various embodiments of the disclosure, the touchscreen display 1810 may include the first plate 1811 and touch display module 1812 positioned on the back surface of the first plate 1811. According to an embodiment, the touch display module 1812 may include a pressure detecting sensor.

According to various embodiments of the disclosure, the electronic device 1800 may have a water-proof structure, which prevents water (or moisture) from being penetrated into an inner space defined by the first support member 1801, and the water-proof structure may be implemented by the first seal member 1820 and the second seal member 1880. According to an embodiment, the first seal member 1820 and the second seal member 1880 may include at least one of a double-sided adhesive tape, an adhesive, water-proof dispensing, silicon, water-proof rubber, or urethane.

According to various embodiments of the disclosure, the PCB 1860 may include a conductive pattern which is at least a portion of a multi-feeding antenna according to an embodiment of the disclosure. For example, a conductive pattern connected to the first antenna element 510 of FIG. 5 may be positioned at the PCB 1860. According to an embodiment of the disclosure, the second support member 1870 may include the remaining conductive pattern of the above-described multi-feeding antenna. According to an embodiment of the disclosure, the PCB may be fixed in a manner of attaching the PCB 1860 to the first support member 1801, and the second support member 1870 may also be positioned to overlap at least partially with the PCB 1860. According to an embodiment, in the case where the second support member 1870 is mounted on the PCB 1860, the conductive pattern of the second support member 1870 may be electrically connected to a conductive pattern of the PCB 1860 and may operate as a single antenna.

According to an embodiment of the disclosure, at least a portion of the touchscreen display 1810 of the electronic device 1800 may operate as an antenna. According to an embodiment of the disclosure, the touchscreen display 1810 may be electrically connected to an antenna element (e.g., second antenna element 132 of FIG. 1) and may operate as a portion of an antenna. For example, the touchscreen display 1810 may be a full-front display covering the entire surface of an electronic device. A ground region included in the touchscreen display 1810 may perform the same role as the metal housing 1510 of FIG. 15, for example.

According to an embodiment of the disclosure, at least a partial region of the touchscreen display 1810 may be the second antenna element 320 of FIG. 3, the second antenna element 420 of FIG. 4, the second antenna element 520 of FIG. 5, the second antenna element 620 of FIG. 6, or the third antenna element 830 of FIG. 8.

According to an embodiment of the disclosure, at least a partial region (hereinafter referred to as a "second antenna element") of the side member 1830 may be the same as or similar to one of the first antenna elements 310, 410, 510, and 610 of FIGS. 3 to 6, the first antenna element 810 of FIG. 8, or the second antenna element 820 of FIG. 8.

According to an embodiment of the disclosure, an electronic device may include a housing (e.g., housing 110 of FIG. 1) including a slit (e.g., first slit 121 of FIG. 1), a first antenna element (e.g., first antenna element 131 of FIG. 1) that extends along a portion of the housing, and a second antenna element (e.g., second antenna element 132 of FIG. 1) which is spaced from at least a portion of the first antenna element by the slit and extends along another portion of the housing. The electronic device may include a wireless communication circuit (e.g., communication circuit 340 of FIG. 3) that is positioned inside the housing and is electrically connected to the first antenna element, and the first antenna element may be electrically connected to the second antenna element.

According to an embodiment of the disclosure, the electronic device may include a switch (e.g., switch 330 of FIG. 3) that adjusts an open/close of an electrical path connecting the first antenna element and the second antenna element.

According to an embodiment of the disclosure, the electronic device may include a printed circuit board (e.g., board 940 of FIG. 10) positioned inside the housing. The first antenna element may be connected to a ground part (e.g., 942 of FIG. 10) that is positioned at the printed circuit board through one point (e.g., first point 321 of FIG. 3).

According to an embodiment of the disclosure, the second antenna element may be connected to a ground part through one point (e.g., second point 322 of FIG. 3). According to an embodiment, the electronic device may include a printed circuit board (e.g., board 940 of FIG. 10) positioned inside the housing, and the ground part may be positioned at the printed circuit board.

According to an embodiment of the disclosure, the electronic device may include a ground region formed along a portion (e.g., second plate 113 of FIG. 1) of the housing. The ground part may be positioned in the ground region.

According to an embodiment of the disclosure, the electronic device may include a switch (e.g., switch 330 of FIG. 3) that adjusts an open/close of an electrical path connecting the ground part and one point (second point 322 of FIG. 3) distinguished from the one point (e.g., first point 321 of FIG. 3).

According to an embodiment of the disclosure, the electrical path may connect a third point (e.g., third point 313 of FIG. 3) of the first antenna element and a first point (e.g., first point 321 of FIG. 3) of the second antenna element, and the third point and the first point may be adjacent to the slit. The third point and the first point may face each other, with the slit interposed between the third point and the first point.

According to an embodiment of the disclosure, the switch (e.g., switch 330 of FIG. 3) is positioned on the printed circuit board. According to various embodiments of the disclosure, the switch may be positioned in a fill cut region of the printed circuit board.

According to an embodiment of the disclosure, the switch may include a radio frequency (RF) port, and the first antenna element and the second antenna element may be connected to the RF port of the switch.

According to an embodiment of the disclosure, the wireless communication circuit may transmit or receive a signal of a first frequency to or from an external device through the first antenna element when the switch is opened, and may transmit or receive a signal of a second frequency to or from an external device through the first antenna element and the second antenna element when the switch is closed.

According to an embodiment of the disclosure, the second frequency may be lower than the first frequency.

According to an embodiment of the disclosure, an electronic device may include a housing (e.g., housing 110 of FIG. 1) that includes a first plate (e.g., first plate 111 of FIG. 1), a second plate (e.g., second plate 113 of FIG. 1) facing away from the first plate, and a side member (e.g., side member 112 of FIG. 1) surrounding a space between the first plate and the second plate. A substantial portion of the second plate may be formed of an electrically conductive material. The side member may be formed of an electrically conductive material, and may include a first side (e.g., first side 112a of FIG. 1) extending in a first direction and having a first length, a second side (e.g., second side 112b of FIG. 1) extending in a second direction perpendicular to the first direction and having a second length shorter than the first length, a third side (e.g., third side 112c of FIG. 1) extending in parallel to the first side and having the first length, and a fourth side (e.g., fourth side 112d of FIG. 1) extending in parallel to the second side and having the second length.

According to an embodiment of the disclosure, the side member may include an elongated slit (e.g., first slit 121 of FIG. 1) extending from a first point in the first side to a second point in the third side along a portion of the first side, the second side, and a portion of the third side. The side member may include a non-conductive material filling the slit.

According to an embodiment of the disclosure, the electronic device may include a touchscreen display (e.g., display module 150 of FIG. 2) exposed through at least a portion of the first plate.

According to an embodiment of the disclosure, the electronic device may include a ground plane that is positioned in the housing in parallel to the second plate and is electrically coupled to a third point (e.g., ground point 942a) of the first side at or near the first point.

According to an embodiment of the disclosure, the electronic device may include a wireless communication circuit (e.g., 340 of FIG. 3) that is positioned inside the housing and is electrically coupled to a fourth point (e.g., 941a of FIG. 10) positioned in one of the portion of the first side, the second side, or the portion of the third side.

According to an embodiment of the disclosure, the electronic device may include at least one processor (e.g., 1920 of FIG. 19) that is positioned inside the housing and is electrically connected to the display and the communication circuit.

According to an embodiment of the disclosure, a fifth point (e.g., switch connection point 943a of FIG. 10) and a sixth point (e.g., switch connection point 943b of FIG. 10) of the side member may be positioned between the third point and the fourth point, when viewed from above the second plate, and on opposite sides of the slit, and the electronic device may include an electrically conductive member that is electrically coupled between the fifth point and the sixth point.

According to an embodiment of the disclosure, the electronic device may include a switching element (e.g., switch 943 of FIG. 10) that is positioned inside the housing and is electrically connected to the fifth point and the sixth point.

According to an embodiment of the disclosure, the wireless communication circuit may provide at least one of a global positioning system (GPS) signal, a wireless fidelity (Wi-Fi) signal, or a Bluetooth signal.

According to an embodiment of the disclosure, the electronic device may include a printed circuit board (e.g., board 940 of FIG. 10) positioned inside the housing. The switching element may be positioned at the printed circuit board.

According to an embodiment of the disclosure, the electronic device may include a fourth conductive member that is coupled to at least one of the fifth point or the sixth point.

According to an embodiment of the disclosure, the second plate may be electrically connected to a ground plane.

According to an embodiment of the disclosure, an electronic device may include a housing (e.g., 1801 of FIG. 18)

that includes a first plate (e.g., 1811 of FIG. 18), a second plate (e.g., 1890 of FIG. 18) facing away from the first plate, and a side member (e.g., side member 1830 of FIG. 18) surrounding a space between the first plate and the second plate.

According to an embodiment of the disclosure, a substantial portion of the second plate is formed of an electrically conductive material, and the side member may be formed of an electrically conductive material and may include a first side (e.g., first side 1831 of FIG. 18) extending in a first direction and having a first length, a second side (e.g., 1832 of FIG. 18) extending in a second direction perpendicular to the first direction and having a second length shorter than the first length, a third side (e.g., third side 1833 of FIG. 18) extending in parallel to the first side and having the first length, and a fourth side (e.g., fourth side 1834 of FIG. 18) extending in parallel to the second side and having the second length.

The housing may include an elongated slit (e.g., first slit 121 of FIG. 1) that is formed between a portion of the side member and a portion of the second plate and extends from a first point in the first side to a second point in the third side along a portion of the first side, the second side, and a portion of the third side, and a non-conductive material filling the slit.

According to an embodiment of the disclosure, the electronic device may include a touchscreen display (e.g., the touchscreen display 1810 of FIG. 18) that is exposed through at least a portion of the first plate, and a ground plane that is positioned in the housing in parallel to the second plate and is electrically coupled to a third point of the first side at or near the first point.

According to an embodiment of the disclosure, the electronic device may include a wireless communication circuit (e.g., 340 of FIG. 3) that is positioned inside the housing and is electrically coupled to a fourth point positioned in one of the portion of the first side, the second side, or the portion of the third side.

According to an embodiment of the disclosure, the electronic device may include at least one processor (e.g., 1920 of FIG. 19) that is positioned inside the housing and is electrically connected to the display and the communication circuit.

According to an embodiment of the disclosure, the electronic device may include an electrically conductive member that is electrically coupled between a fifth point (switch connection point 943a of FIG. 10) in the side member and a sixth point (e.g., switch connection point 943b of FIG. 10) in the second plate. The fifth point and the sixth point may be positioned between the third point and the fourth point, when viewed from above the second plate, and on opposite sides of the slit.

According to an embodiment of the disclosure, the electronic device may include a switching element (e.g., switch 943 of FIG. 10) that is positioned inside the housing and is electrically connected to the fifth point and the sixth point.

Figure 19:
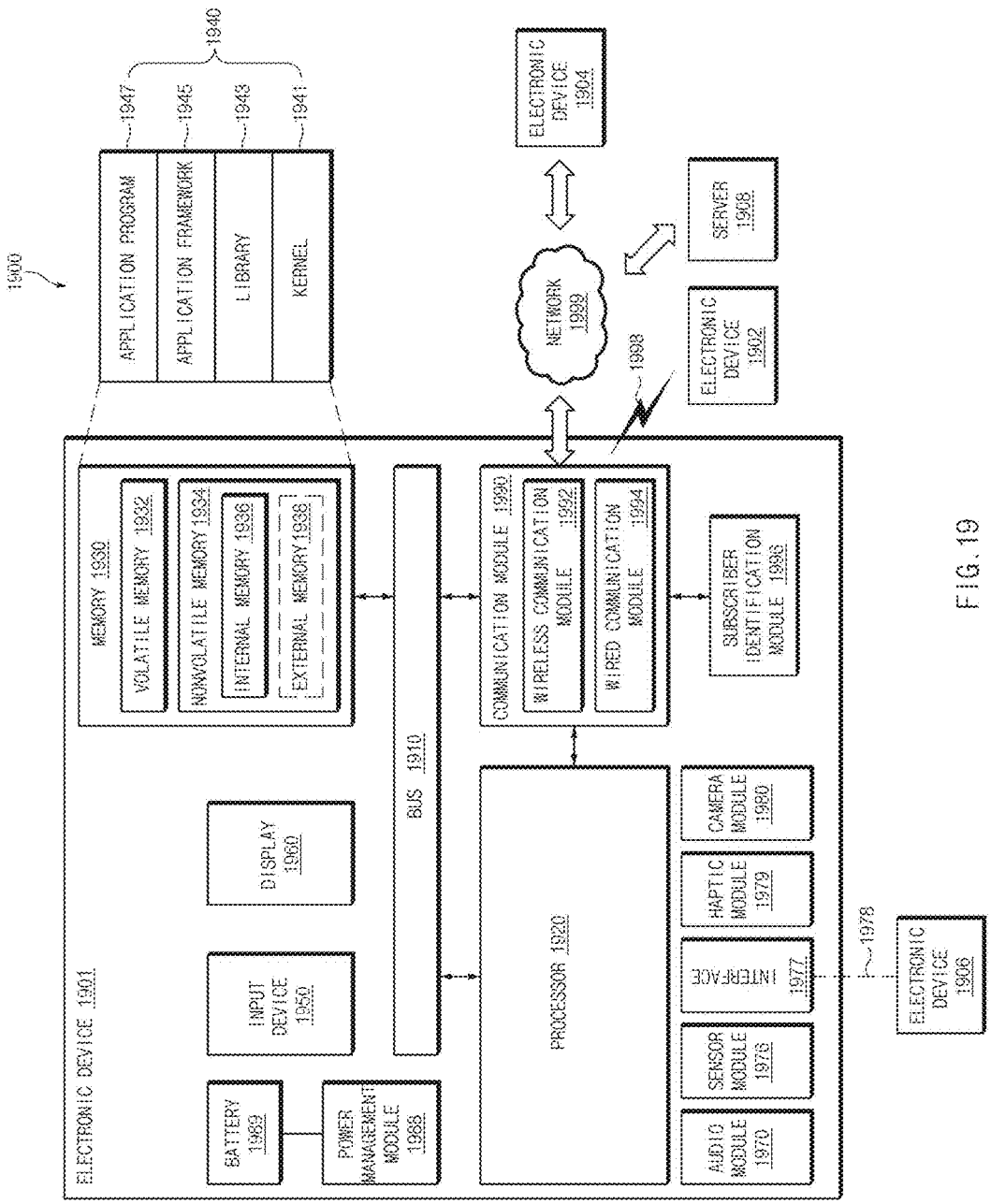
FIG. 19 is a block diagram of an electronic device in a network environment according to various embodiments of the disclosure.

FIG. 19 illustrates a block diagram of an electronic device 1901 in a network environment 1900, according to various embodiments. An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or motion picture experts group (MPEG-1 or MPEG-2) audio layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HIVIDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment of the disclosure, the electronic device may include at least one of navigation devices, satellite navigation system (e.g., global navigation satellite system (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which have measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 19, under the network environment 1900, the electronic device 1901 (e.g., the electronic device 100 of FIG. 1, the electronic device 700 of FIG. 7, the electronic device 900 of FIG. 9, the electronic device 1500 of FIG. 15) may communicate with an electronic device 1902 through local wireless communication 1998 or may communication with an electronic device 1904 or a server 1908 through a network 1999. According to an embodiment of the disclosure, the electronic device 1901 may communicate with the electronic device 1904 through the server 1908.

According to an embodiment of the disclosure, the electronic device 1901 may include a bus 1910, the processor 1920, the memory 1930, an input device 1950 (e.g., a micro-phone or a mouse), a display device 1960, an audio module 1970, a sensor module 1976, an interface 1977, a haptic module 1979, a camera module 1980, a power management module 1988, a battery 1989, the communication module 1990, and a subscriber identification module 1996. According to an embodiment, the electronic device 1901 may not include at least one (e.g., the display device 1960 or the camera module 1980) of the above-described components or may further include other component(s).

The bus 1910 may interconnect the above-described components 1920 to 1990 and may include a circuit for conveying signals (e.g., a control message or data) between the above-described components.

The processor 1920 may include one or more of a central processing unit (CPU), an application processor (AP), a graphic processing unit (GPU), an image signal processor (ISP) of a camera or a communication processor (CP). According to an embodiment, the processor 1920 may be implemented with a system on chip (SoC) or a system in package (SiP). For example, the processor 1920 may drive an operating system (OS) or an application program to control at least one of another component (e.g., hardware or software component) of the electronic device 1901 connected to the processor 1920 and may process and compute various data. The processor 1920 may load a command or data, which is received from at least one of other components (e.g., the communication module 1990), into a volatile memory 1932 to process the command or data and may store the result data into a nonvolatile memory 1934.

The memory 1930 may include, for example, the volatile memory 1932 or the nonvolatile memory 1934. The volatile memory 1932 may include, for example, a random access memory (RAM) (e.g., a dynamic RAM (DRAM), a static RAM (SRAM), or a synchronous DRAM (SDRAM)). The nonvolatile memory 1934 may include, for example, a programmable read-only memory (PROM), a one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1934 may be configured in the form of an internal memory 1936 or the form of an external memory 1938 which is available through connection only if necessary, according to the connection with the electronic device 1901. The external memory 1938 may further include a flash drive such as compact flash (CF), secure digital (SD), micro secure digital (Micro-SD), mini secure digital (Mini-SD), extreme digital (xD), a multimedia card (MMC), or a memory stick. The external memory 1938 may be operatively or physically connected with the electronic device 1901 in a wired manner (e.g., a cable or a universal serial bus (USB)) or a wireless (e.g., Bluetooth) manner.

For example, the memory 1930 may store, for example, at least one different software component, such as a command or data associated with the program 1940, of the electronic device 1901. The program 1940 may include, for example, a kernel 1941, a library 1943, an application framework 1945 or an application program (interchangeably, "application") 1947.

The input device 1950 may include a microphone, a mouse, or a keyboard. According to an embodiment, the keyboard may include a keyboard physically connected or a virtual keyboard displayed through the display device 1960.

The display device 1960 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be positioned inside or outside the electronic device 1901.

The audio module 1970 may convert, for example, from a sound into an electrical signal or from an electrical signal into the sound. According to an embodiment, the audio module 1970 may acquire sound through the input device 1950 (e.g., a microphone) or may output sound through an output device (not illustrated) (e.g., a speaker or a receiver) included in the electronic device 1901, an external electronic device (e.g., the electronic device 1902 (e.g., a wireless speaker or a wireless headphone)) or an electronic device 1906 (e.g., a wired speaker or a wired headphone) connected with the electronic device 1901

The sensor module 1976 may measure or detect, for example, an internal operating state (e.g., power or temperature) of the electronic device 1901 or an external environment state (e.g., an altitude, a humidity, or brightness) to generate an electrical signal or a data value corresponding to the information of the measured state or the detected state. The sensor module 1976 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an ultra violet (UV) sensor. The sensor module 1976 may further include a control circuit for controlling at least one or more sensors included therein. According to an embodiment, the electronic device 1901 may control the sensor module 1976 by using the processor 1920 or a processor (e.g., a sensor hub) separate from the processor 1920. In the case that the separate processor (e.g., a sensor hub) is used, while the processor 1920 is in a sleep state, the separate processor may operate without awakening the processor 1920 to control at least a portion of the operation or the state of the sensor module 1976.

According to an embodiment of the disclosure, the interface 1977 may include a high definition multimedia interface (HDMI), a USB, an optical interface, a recommended standard 232 (RS-232), a D-subminiature (D-sub), a mobile high-definition link (MHL) interface, a SD card/MMC (multi-media card) interface, or an audio interface. A connector 1978 may physically connect the electronic device 1901 and the electronic device 1906. According to an embodiment, the connector 1978 may include, for example, an USB connector, an SD card/MMC connector, or an audio connector (e.g., a headphone connector).

The haptic module 1979 may convert an electrical signal into mechanical stimulation (e.g., vibration or motion) or into electrical stimulation. For example, the haptic module 1979 may apply tactile or kinesthetic stimulation to a user. The haptic module 1979 may include, for example, a motor, a piezoelectric component, or an electric stimulator.

The camera module 1980 may capture, for example, a still image and a moving picture. According to an embodiment, the camera module 1980 may include at least one lens (e.g., a wide-angle lens and a telephoto lens, or a front lens and a rear lens), an image sensor, an image signal processor, or a flash (e.g., a light emitting diode or a xenon lamp).

The power management module 1988, which is to manage the power of the electronic device 1901, may constitute at least a portion of a power management integrated circuit (PMIC).

The battery 1989 may include a primary cell, a secondary cell, or a fuel cell and may be recharged by an external power source to supply power at least one component of the electronic device 1901.

The communication module 1990 may establish a communication channel between the electronic device 1901 and an external device (e.g., the first external electronic device 1902, the second external electronic device 1904, or the server 1908). The communication module 1990 may support wired communication or wireless communication through the established communication channel. According to an embodiment, the communication module 1990 may include a wireless communication module 1992 or a wired communication module 1994. The communication module 1990 may communicate with the external device through a first network 1998 (e.g. a wireless local area network such as Bluetooth or infrared data association (IrDA)) or a second network 1999 (e.g., a wireless wide area network such as a cellular network) through a relevant module among the wireless communication module 1992 or the wired communication module 1994.

The wireless communication module 1992 may support, for example, cellular communication, local wireless communication, GNSS communication. The cellular communication may include, for example, LTE, LTE Advance (LTE-A), code division multiple access (CDMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), bluetooth, bluetooth low energy (BLE), Zigbee, near field communication (NFC), magnetic secure transmission (MST), radio frequency (RF), or a body area network (BAN). The GNSS may include at least one of a GPS, a Glonass, beidou navigation satellite system (Beidou), the European global satellite-based navigation system (Galileo), or the like. In the disclosure, "GPS" and "GNSS" may be interchangeably used.

According to an embodiment of the disclosure, when the wireless communication module 1992 supports cellar communication, the wireless communication module 1992 may, for example, identify or authenticate the electronic device 1901 within a communication network using the subscriber identification module (e.g., a SIM card) 1996. According to an embodiment, the wireless communication module 1992 may include a CP separate from the processor 1920 (e.g., an AP). In this case, the communication processor may perform at least a portion of functions associated with at least one of components 1910 to 1996 of the electronic device 1901 in substitute for the processor 1920 when the processor 1920 is in an inactive (sleep) state, and together with the processor 1920 when the processor 1920 is in an active state. According to an embodiment, the wireless communication module 1992 may include a plurality of communication modules, each supporting only a relevant communication scheme among cellular communication, local wireless communication, or a GNSS communication.

The wired communication module 1994 may include, for example, a local area network (LAN) service, a power line communication, or a plain old telephone service (POTS).

For example, the first network 1998 may employ, for example, Wi-Fi direct or Bluetooth for transmitting or receiving commands or data through wireless direct connection between the electronic device 1901 and the first external electronic device 1902. The second network 1999 may include a telecommunication network (e.g., a computer network such as a LAN or a wireless area network (WAN), the Internet or a telephone network) for transmitting or receiving commands or data between the electronic device 1901 and the second electronic device 1904.

According to various embodiments of the disclosure, the commands or the data may be transmitted or received between the electronic device 1901 and the second external electronic device 1904 through the server 1908 connected with the second network 1999. Each of the first and second external electronic devices 1902 and 1904 may be a device of which the type is different from or the same as that of the electronic device 1901. According to various embodiments, all or a part of operations that the electronic device 1901 will perform may be executed by another or a plurality of electronic devices (e.g., the electronic devices 1902 and 1904 or the server 1908). According to an embodiment, in the case that the electronic device 1901 executes any function or service automatically or in response to a request, the electronic device 1901 may not perform the function or the service internally, but may alternatively or additionally transmit requests for at least a part of a function associated with the electronic device 1901 to any other device (e.g., the electronic device 1902 or 1904 or the server 1908). The other electronic device (e.g., the electronic device 1902 or 1904 or the server 1908) may execute the requested function or additional function and may transmit the execution result to the electronic device 1901. The electronic device 1901 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one element from another element but is not limited to these components. When a (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an AP) which performs corresponding operations by executing one or more software programs which are stored in a memory device (e.g., the memory 1930).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an ASIC chip, a FPGA, and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 1930) in the form of a program module. The instruction, when executed by a processor (e.g., the processor 1920), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-elements may be omitted, or other sub-elements may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a slit;
a first antenna element extending along a portion of the housing;
a second antenna element spaced apart from at least a portion of the first antenna element by the slit, and extending along another portion of the housing;
a wireless communication circuit positioned inside the housing, and electrically connected to the first antenna element; and
a switch configured to:
adjust an open/close of an electrical path connecting the first antenna element and the second antenna element, and
selectively connect the first antenna element and the second antenna element,
wherein a length of the slit is reduced based on the first antenna element being electrically connected to the second antenna element by the switch.

2. The electronic device of claim 1, further comprising:
a printed circuit board positioned inside the housing,
wherein the first antenna element is connected to a ground part positioned at the printed circuit board through a first point of the first antenna element.

3. The electronic device of claim 1, wherein the second antenna element is connected to a ground part through a first point of the second antenna element.

4. The electronic device of claim 3, further comprising:
a printed circuit board positioned inside the housing,
wherein the ground part is positioned at the printed circuit board.

5. The electronic device of claim 3, further comprising:
a ground region formed along a portion of the housing,
wherein the ground part is positioned in the ground region.

6. The electronic device of claim 2,
wherein a first point of the switch is connected to a second point of the first antenna element distinguished from the first point of the first antenna and a second point of the switch is connected to the ground part.

7. The electronic device of claim 1,
wherein the electrical path connects a first point of the first antenna element and a second point of the second antenna element, and
wherein the first point and the second point are adjacent to the slit.

8. The electronic device of claim 7, wherein the first point and the second point face each other, with the slit interposed between the first point and the second point.

9. The electronic device of claim 1, further comprising:
a printed circuit board positioned inside the housing,
wherein the switch is positioned on the printed circuit board.

10. The electronic device of claim 9, wherein the switch is positioned in a fill cut region of the printed circuit board.

11. The electronic device of claim 1,
wherein the switch includes a radio frequency (RF) port, and
wherein the first antenna element and the second antenna element are connected to the RF port of the switch.

12. The electronic device of claim 1, wherein the wireless communication circuit is configured to:
transmit or receive a signal of a first frequency to or from an external device through the first antenna element when the switch is opened, and
transmit or receive a signal of a second frequency to or from an external device through the first antenna element and the second antenna element when the switch is closed.

13. The electronic device of claim 12, wherein the second frequency is higher than the first frequency.

14. An electronic device comprising:
a housing including:
a first plate,
a second plate facing away from the first plate, and
a side member surrounding a space between the first plate and the second plate, the side member including:
a first side extending in a first direction and having a first length,
a second side extending in a second direction perpendicular to the first direction and having a second length shorter than the first length, a third side extending in parallel to the first side and having the first length, a fourth side extending in parallel to the second side and having the second length, and an elongated slit extending from a first point in the first side to a second point in the third side along a portion of the first side, the second side, and a portion of the third side, and a non-conductive material filling the slit;

a touchscreen display exposed through at least a portion of the first plate;

a ground plane positioned in the housing in parallel to the second plate, and electrically coupled to a third point of the first side at or near the first point;

a wireless communication circuit positioned inside the housing and electrically coupled to a fourth point positioned in one of the portion of the first side, the second side, or the portion of the third side;

at least one processor positioned inside the housing and electrically connected to the display and the communication circuit;

an electrically conductive member electrically coupled between a fifth point and a sixth point of the side member, wherein the fifth point and the sixth point are positioned between the third point and the fourth point, when viewed from above the second plate, and on opposite sides of the slit; and a switching element positioned inside the housing and electrically connected to the fifth point and the sixth point, wherein a substantial portion of the second plate is formed of an electrically conductive material, and wherein the side member is formed of an electrically conductive material.

15. The electronic device of claim 14, wherein the wireless communication circuit provides at least one of a global positioning system (GPS) signal, a Wi-Fi signal, or a Bluetooth signal.

16. The electronic device of claim 14, further comprising:
a printed circuit board positioned inside the housing,
wherein the switching element is positioned at the printed circuit board.

17. The electronic device of claim 14, further comprising:
a flexible conductive member coupled to at least one of the fifth point or the sixth point.

18. The electronic device of claim 14, wherein the second plate is electrically connected to the ground plane.

19. An electronic device comprising:
a housing including:
a first plate,
a second plate facing away from the first plate,
a side member surrounding a space between the first plate and the second plate, the side member including:
a first side extending in a first direction and having a first length;
a second side extending in a second direction perpendicular to the first direction and having a second length shorter than the first length;
a third side extending in parallel to the first side and having the first length; and
a fourth side extending in parallel to the second side and having the second length, and
an elongated slit formed between a portion of the side member and a portion of the second plate, wherein the slit extends from a first point in the first side to a second point in the third side along a portion of the first side, the second side, and a portion of the third side;
a non-conductive material filling the slit;
a touchscreen display exposed through at least a portion of the first plate;
a ground plane positioned in the housing parallel to the second plate, and electrically coupled to a third point of the first side at or near the first point;
a wireless communication circuit positioned inside the housing and electrically coupled to a fourth point positioned in one of the portion of the first side, the second side, or the portion of the third side;
at least one processor positioned inside the housing and electrically connected to the display and the communication circuit;
an electrically conductive member electrically coupled between a fifth point in the side member and a sixth point in the second plate, wherein the fifth point and the sixth point are positioned between the third point and the fourth point, when viewed from above the second plate, and on opposite sides of the slit; and
a switching element positioned inside the housing and electrically connected to the fifth point and the sixth point,
wherein a substantial portion of the second plate is formed of an electrically conductive material, and
wherein the side member is formed of an electrically conductive material.

\* \* \* \* \*